United States Patent
Tu et al.

(10) Patent No.: US 9,756,178 B2
(45) Date of Patent: Sep. 5, 2017

(54) CROSSTALK ESTIMATION METHOD, APPARATUS, AND SYSTEM

(71) Applicant: Huawei Technologies Co., Ltd., Shenzhen (CN)

(72) Inventors: Jianping Tu, Shenzhen (CN); Zhong Pan, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/412,678

(22) Filed: Jan. 23, 2017

(65) Prior Publication Data
US 2017/0134569 A1 May 11, 2017

Related U.S. Application Data

(63) Continuation of application No. PCT/CN2014/082934, filed on Jul. 24, 2014.

(51) Int. Cl.
*H04M 1/24* (2006.01)
*H04M 3/08* (2006.01)
(Continued)

(52) U.S. Cl.
CPC .............. *H04M 3/34* (2013.01); *H04B 3/487* (2015.01); *H04L 12/6418* (2013.01); *H04L 2012/6478* (2013.01)

(58) Field of Classification Search
CPC ......... H04B 3/238; H04B 3/32; H04L 5/1438; H04L 2025/03426; H04L 2025/03751;
(Continued)

(56) References Cited

U.S. PATENT DOCUMENTS 8,204,100 B2 * 6/2012 Schenk ................. H04B 3/32
330/149
2010/0046738 A1 2/2010 Schelstraete et al.
(Continued)

FOREIGN PATENT DOCUMENTS

CN 101350659 A 1/2009
CN 101795152 A 8/2010
(Continued)

OTHER PUBLICATIONS

"Series G: Transmission Systems and Media, Digital Systems and Networks, Digital sections and digital line system—Access networks, Self-FEXT cancellation (vectoring) for use with VDSL2 transceivers," ITU-T, G.993.5, Apr. 2010, 80 pages.
(Continued)

*Primary Examiner* — Binh Tieu
(74) *Attorney, Agent, or Firm* — Conley Rose, P.C.

(57) ABSTRACT

A crosstalk processing method, an apparatus, and a system comprise a transceiver of a line that generates, respectively according to pilot sequences allocated by a vectoring control entity, pilot training signals that are within different spectral ranges and that satisfy a preset relationship with a pilot training signal of another line such that a receiver of the line can determine sample errors respectively according to the different pilot training signals. A vectoring control entity then determines crosstalk channel coefficients from the other line into an inband spectrum and an out-of-band spectrum of the line, and performs precoding processing on a to-be-sent data signal of the line to eliminate impact of crosstalk from the other line to the inband and out-of-band spectrums of the line.

19 Claims, 11 Drawing Sheets

(51) Int. Cl.
*H04M 3/22* (2006.01)
*H04M 3/34* (2006.01)
*H04B 3/487* (2015.01)
*H04L 12/64* (2006.01)

(58) Field of Classification Search
CPC ...... H04L 2025/03764; H04M 11/062; H04M 3/002; F42B 10/146
USPC ........ 379/1.01, 1.03, 1.04, 22.02, 22.08, 23, 379/24, 27.02, 27.03
See application file for complete search history.

(56) References Cited

U.S. PATENT DOCUMENTS

| | | | |
|---|---|---|---|
| 2010/0177838 A1* | 7/2010 | Schenk | H04B 3/32 375/285 |
| 2012/0269289 A1* | 10/2012 | Schenk | H04B 3/32 375/296 |
| 2014/0050273 A1 | 2/2014 | Rao | |
| 2015/0222326 A1* | 8/2015 | Cioffi | H04L 5/1438 370/201 |
| 2016/0080031 A1* | 3/2016 | Kassel | H04M 11/062 379/406.06 |

FOREIGN PATENT DOCUMENTS

| | | |
|---|---|---|
| CN | 102388588 A | 3/2012 |
| EP | 2442510 A1 | 4/2012 |

OTHER PUBLICATIONS

Foreign Communication From a Counterpart Application, PCT Application No. PCT/CN2014/082934, English Translation of International Search Report dated Apr. 29, 2015, 2 pages.
Foreign Communication From a Counterpart Application, PCT Application No. PCT/CN2014/082934, English Translation of Written Opinion dated Apr. 29, 2015, 6 pages.
Cendrillon, R., et al., "Challenges and Solutions in Vectored DSL," XP008170553, Lecture Notes of the Instate for Computer Science, Conference Paper, vol. 37, Nov. 1-3, 2009, pp. 192-203.
Oksman, V., et al., "The ITU-T's New G.vector Standard Proliferates 100 Mb/s DSL," XP011341175, IEEE Communications Magazine, Oct. 2010, pp. 140-148.
Foreign Communication From a Counterpart Application, European Application No. 14898201.0, Extended European Search Report dated May 29, 2017, 9 pages.

* cited by examiner

| A vectoring control entity allocates a first pilot sequence and a second pilot sequence, respectively, to a first line and a second line that are in a digital subscriber line system, so that a transceiver at one end of the first line sends a first pilot training signal and a third pilot training signal according to the first pilot sequence, and a transceiver at one end of the second line sends a second pilot training signal according to the second pilot sequence | S500 |

↓

| The vectoring control entity receives error sample signals sent by a transceiver at a peer end of the first line and a transceiver at a peer end of the second line | S510 |

↓

| The vectoring control entity determines a first crosstalk channel coefficient from the second line into the first line and a second crosstalk channel coefficient from the first line into the second line according to the error sample signals, the first pilot sequence, and the second pilot sequence | S520 |

↓

| The vectoring control entity determines a first mirror coefficient of the first crosstalk channel coefficient | S700 |

↓

| The vectoring control entity obtains a third mirror signal of a third to-be-sent signal of the first line | S710 |

↓

| The vectoring control entity performs precoding processing on to-be-sent signals of the first line and the second line according to the first crosstalk channel coefficient, the second crosstalk channel coefficient, the first mirror coefficient, and the third mirror signal, to determine a precoded signal of a first to-be-sent signal of the first line, a precoded signal of the third mirror signal, and a precoded signal of a second to-be-sent signal of the second line | S720 |

FIG. 7

```
┌─────────────────────────────────────────────────────────────┐
│ A vectoring control entity allocates a first pilot sequence and a second │
│ pilot sequence, respectively, to a first line and a second line, where the │
│ first line and the second line are in a digital subscriber line system, so │
│ that a transceiver at one end of the first line generates a first pilot │ ─── S900
│ training signal that is corresponding to the first pilot sequence on odd │
│ subcarriers matching a preset modulation interval, with 1s or 0s on │
│ other subcarriers, and generates a third pilot training signal that is │
│ corresponding to the first pilot sequence on even subcarriers matching │
│ the preset modulation interval, with 1s or 0s on other subcarriers │
└─────────────────────────────────────────────────────────────┘
                              ↓
┌─────────────────────────────────────────────────────────────┐
│ The vectoring control entity separately receives error sample signals │ ─── S910
│ sent by a transceiver at a peer end of the first line and a transceiver at a │
│ peer end of the second line │
└─────────────────────────────────────────────────────────────┘
                              ↓
┌─────────────────────────────────────────────────────────────┐
│ The vectoring control entity calculates, on the odd subcarriers matching │ ─── S920
│ the preset modulation interval, a third crosstalk channel coefficient │
│ from the first line into the second line and separately calculates, on the │
│ even subcarriers matching the preset modulation interval, a fourth │
│ crosstalk channel coefficient from the first line into the second line │
└─────────────────────────────────────────────────────────────┘
                              ↓
┌─────────────────────────────────────────────────────────────┐
│ The vectoring control entity determines a fourth mirror coefficient of │ ─── S101
│ the fourth crosstalk channel coefficient within an overlapping spectral │
│ range of the first line and the second line │
└─────────────────────────────────────────────────────────────┘
                              ↓
┌─────────────────────────────────────────────────────────────┐
│ The vectoring control entity obtains a third mirror signal of a third to- │ ─── S102
│ be-sent signal of the first line │
└─────────────────────────────────────────────────────────────┘
                              ↓
┌─────────────────────────────────────────────────────────────┐
│ The vectoring control entity performs precoding processing on to-be- │
│ sent signals of the first line and the second line according to a second │
│ crosstalk channel coefficient, the third crosstalk channel coefficient, │
│ the fourth crosstalk channel coefficient, the fourth mirror coefficient, │ ─── S103
│ and the third mirror signal, to determine a precoded signal of a first to- │
│ be-sent signal of the first line, a precoded signal of the third to-be-sent │
│ signal, and a precoded signal of a second to-be-sent signal of the │
│ second line │
└─────────────────────────────────────────────────────────────┘
```

FIG. 10

CROSSTALK ESTIMATION METHOD, APPARATUS, AND SYSTEM

CROSS-REFERENCE TO RELATED APPLICATIONS

This application is a continuation of International Application No. PCT/CN2014/082934, filed on Jul. 24, 2014, the disclosure of which is hereby incorporated by reference in its entirety.

TECHNICAL FIELD

Embodiments of the present disclosure relate to the field of communications technologies, and in particular, to a crosstalk estimation method, an apparatus, and a system.

BACKGROUND

X Digital Subscriber Line (xDSL) is a technology for high-speed data transmission over a telephone twisted-pair cable, or unshielded twisted pair (UTP). For a passband transmission xDSL, a frequency division multiplexing technology is used to enable the xDSL to coexist with a plain old telephone service (POTS) on a same twisted pair. The xDSL occupies a high frequency band and the POTS occupies a baseband part below 4 kilohertz (KHz). At a signal receiving end, a splitter is used to separate a POTS signal from an xDSL signal. A system providing access for multiple xDSLs is referred to as a digital subscriber line (DSL) access multiplexer (DSLAM).

As a result of electromagnetic induction, multiple signals connected by a DSLAM cause interference to each other, which is referred to as crosstalk (Crosstalk). There are two types of crosstalk, including far-end crosstalk (FEXT) and near-end crosstalk (NEXT). FIG. 1 is a schematic diagram of far-end crosstalk and FIG. 2 is a schematic diagram of near-end crosstalk. In the figures, TX represents a signal transmitting end, RX represents a signal receiving end, CO represents a central office, CPE represents a user side, downstream represents a downstream signal, and upstream represents an upstream signal.

Energy of both near-end crosstalk and far-end crosstalk increases as a frequency band goes higher. In prior-art xDSL technologies, such as Asymmetric DSL (ADSL), ADSL2, ADSL2+, Very High Bit Rate DSL (VDSL), and VDSL2, frequency division duplex (FDD) is used for upstream and downstream channels, impact of NEXT on system performance may be ignored and there mainly exists impact of FEXT. As xDSL uses an increasingly wide frequency band, impact of FEXT on transmission performance of VDSL2 is increasingly severe. At present, a vectoring technology has been introduced in the industry to enable joint transmission and reception at a central office (CO) so as to cancel FEXT crosstalk.

A VDSL2 standard defines eight configuration profiles, which are 8a, 8b, 8c, 8d, 12a, 12b, 17a, and 30a. In a vector DSL system, there are also lines of multiple profiles. For example, when a 17a line (that is, a line whose profile is 17a) coexists with a 30a line (that is, a line whose profile is 17a), on one hand, there is still an out-of-band spectrum above 17 megahertz (MHz) for the 17a line, and although a low-pass filter may be used, power of a 17-21 MHz out-of-band spectrum is still above −80 decibel-milliwatts per hertz (dBm/Hz). In a downstream direction, the out-of-band spectrum for signal transmission over the 17a line causes relatively strong FEXT interference to frequencies above 17 MHz of the 30a line. On the other hand, the spectrum above 17 MHz of the 30a line also causes FEXT interference to the out-of-band spectrum of the 17a line. When a modem at a receive end of the 17a line uses 1× sampling, this part of out-of-band interference is aliased to the inband spectrum of the 17a line, resulting in a decrease of a rate of the 17a line.

The foregoing FEXT crosstalk between the 17a line and the 30a line affects effects and stability of fiber to the customer (FTTC) acceleration.

SUMMARY

Embodiments of the present disclosure provide a crosstalk estimation method, an apparatus, and a system, to resolve a problem in an existing vector DSL system that FEXT crosstalk between two groups of lines of different profiles affects effects and stability of FTTC acceleration.

According to a first aspect, an embodiment of the present disclosure provides a crosstalk estimation method, including receiving, by a transceiver at one end of a first line, a first pilot sequence allocated by a vectoring control entity in a digital subscriber line system, generating and sending, by the transceiver at the one end of the first line, a first pilot training signal and a third pilot training signal according to the first pilot sequence, where the first pilot training signal is a pilot training signal of the first line within an overlapping spectral range of the first line and a second line, the third pilot training signal is a pilot training signal of the first line out of the overlapping spectral range of the first line and the second line, and an out-of-band spectrum of the second line overlaps an inband spectrum of the first line, generating, by a transceiver at a peer end of the first line, error sample signals according to the first pilot training signal and the third pilot training signal, and sending, by the transceiver at the peer end of the first line, the error sample signals to the vectoring control entity to determine a first crosstalk channel coefficient from the second line into the first line.

In a first possible implementation form of the first aspect, the sending, by the transceiver at the peer end of the first line, the error sample signals to the vectoring control entity to determine a first crosstalk channel coefficient from the second line into the first line includes sending, by the transceiver at the peer end of the first line, the error sample signals to the vectoring control entity such that the vectoring control entity determines the first crosstalk channel coefficient from the second line into the first line according to the error sample signals, the first pilot sequence, and a second pilot sequence, where the second pilot sequence is a pilot sequence allocated by the vectoring control entity to the second line, the first pilot training signal is orthogonal to a second pilot training signal generated by a transceiver at one end of the second line according to the second pilot sequence, and the third pilot training signal is orthogonal to an out-of-band mirror signal of the second pilot training signal.

With reference to the first aspect or the first possible implementation form of the first aspect, in a second possible implementation form of the first aspect, the third pilot training signal is a mirror signal of the first pilot training signal out of an overlapping spectral region of the first line and the second line.

With reference to the first possible implementation form of the first aspect, in a third possible implementation form of the first aspect, the first pilot training signal and the second pilot training signal are mutually orthogonal signals, and the third pilot training signal and the second pilot training signal are mutually orthogonal signals.

With reference to the third possible implementation form of the first aspect, in a fourth possible implementation form of the first aspect, the generating and sending, by the transceiver at the one end of the first line, a first pilot training signal and a third pilot training signal according to the first pilot sequence includes generating, by the transceiver at the one end of the first line, a first pilot training signal that corresponds to the first pilot sequence on odd subcarriers matching a preset modulation interval, with 1s or 0s on other subcarriers, and generating a third pilot training signal that corresponds to the first pilot sequence on even subcarriers matching the preset modulation interval, with 1s or 0s on other subcarriers.

With reference to the third possible implementation form of the first aspect, in a fifth possible implementation form of the first aspect, the generating and sending, by the transceiver at the one end of the first line, a first pilot training signal and a third pilot training signal according to the first pilot sequence includes generating, by the transceiver at the one end of the first line, a first pilot training signal that corresponds to the first pilot sequence on even subcarriers matching a preset modulation interval, with 1s or 0s on other subcarriers, and generating a third pilot training signal that corresponds to the first pilot sequence on odd subcarriers matching the preset modulation interval, with 1s or 0s on other subcarriers.

With reference to the fourth or the fifth possible implementation form of the first aspect, in a sixth possible implementation form of the first aspect, the preset modulation interval is an integer multiple of 2.

With reference to the first aspect or the first possible implementation form of the first aspect, in a seventh possible implementation form of the first aspect, the method further includes receiving, by the transceiver at the one end of the first line, a third pilot sequence allocated by the vectoring control entity, where the first pilot sequence, the second pilot sequence, and the third pilot sequence are mutually orthogonal, and the generating and sending, by the transceiver at the one end of the first line, a first pilot training signal and a third pilot training signal according to the first pilot sequence includes generating and sending, by the transceiver at the one end of the first line, the first pilot training signal according to the first pilot sequence and generating and sending the third pilot training signal according to the third pilot sequence.

With reference to the first aspect, or the first, second, third, fourth, fifth, sixth, or seventh possible implementation form of the first aspect, in an eighth possible implementation form of the first aspect, the first line is a 30a line and the second line is a 17a line.

According to a second aspect, an embodiment of the present disclosure provides a line apparatus, including a first transceiver configured to receive a first pilot sequence allocated by a vectoring control entity in a digital subscriber line system, where the first transceiver is further configured to generate and send a first pilot training signal and a third pilot training signal according to the first pilot sequence, the first pilot training signal is a pilot training signal of the first line within an overlapping spectral range of the first line and a second line, the third pilot training signal is a pilot training signal of the first line out of the overlapping spectral range of the first line and the second line, and an out-of-band spectrum of the second line overlaps an inband spectrum of the first line, and a second transceiver is configured to generate error sample signals according to the first pilot training signal and the third pilot training signal, where the second transceiver is further configured to send the error sample signals to the vectoring control entity to determine a first crosstalk channel coefficient from the second line into the first line.

In a first possible implementation form of a second aspect, the second transceiver is configured to send the error sample signals to the vectoring control entity such that the vectoring control entity determines the first crosstalk channel coefficient from the second line into the first line according to the error sample signals, the first pilot sequence, and a second pilot sequence, where the second pilot sequence is a pilot sequence allocated by the vectoring control entity to the second line, the first pilot training signal is orthogonal to a second pilot training signal generated by a transceiver at one end of the second line according to the second pilot sequence, and the third pilot training signal is orthogonal to an out-of-band mirror signal of the second pilot training signal.

With reference to the second aspect or the first possible implementation form of the second aspect, in a second possible implementation form of the second aspect, the third pilot training signal is a mirror signal of the first pilot training signal out of an overlapping spectral region of the first line and the second line.

With reference to the second possible implementation form of the second aspect, in a third possible implementation form of the second aspect, the first pilot training signal and the second pilot training signal are mutually orthogonal signals, and the third pilot training signal and the second pilot training signal are mutually orthogonal signals.

With reference to the third possible implementation form of the second aspect, in a fourth possible implementation form of the second aspect, the first transceiver is configured to generate a first pilot training signal that corresponds to the first pilot sequence on odd subcarriers matching a preset modulation interval, with 1s or 0s on other subcarriers, and generate a third pilot training signal that corresponds to the first pilot sequence on even subcarriers matching the preset modulation interval, with 1s or 0s on other subcarriers.

With reference to the third possible implementation form of the second aspect, in a fifth possible implementation form of the second aspect, the first transceiver is configured to generate a first pilot training signal that corresponds to the first pilot sequence on even subcarriers matching a preset modulation interval, with 1s or 0s on other subcarriers, and generate a third pilot training signal that corresponds to the first pilot sequence on odd subcarriers matching the preset modulation interval, with 1s or 0s on other subcarriers.

With reference to the fourth or the fifth possible implementation form of the second aspect, in a sixth possible implementation form of the second aspect, the preset modulation interval is an integer multiple of 2.

With reference to the second aspect or the first possible implementation form of the second aspect, in a seventh possible implementation form of the second aspect, the first transceiver is further configured to receive a third pilot sequence allocated by the vectoring control entity, where the first pilot sequence and the third pilot sequence are mutually orthogonal, and generate and send the first pilot training signal according to the first pilot sequence and generate and send the third pilot training signal according to the third pilot sequence.

With reference to the second aspect, or the first, second, third, fourth, fifth, sixth, or seventh possible implementation form of the second aspect, in an eighth possible implementation form of the first aspect, the first line is a 30a line and the second line is a 17a line.

According to a third aspect, an embodiment of the present disclosure provides a crosstalk estimation system, including the line apparatus according to the embodiment of the second aspect and a vectoring control entity.

According to the crosstalk estimation method, the apparatus, and the system provided in the embodiments of the present disclosure, a transceiver of a line generates, respectively according to pilot sequences allocated by a vectoring control entity, pilot training signals that are within different spectral ranges and that satisfy a preset relationship with a pilot training signal of another line such that a receiver of the line can determine sample errors respectively according to the different pilot training signals. Then, the vectoring control entity determines crosstalk channel coefficients from the other line into an inband spectrum and an out-of-band spectrum of the line, and performs precoding processing on a to-be-sent data signal of the line to eliminate impact of crosstalk from the other line to the inband and out-of-band spectrums of the line. This reduces impact on a line rate caused by inter-line crosstalk in a system in which lines of different profiles coexist, and further improves effects and stability of FTTC acceleration.

BRIEF DESCRIPTION OF DRAWINGS

To describe the technical solutions in the embodiments of the present disclosure more clearly, the following briefly describes the accompanying drawings required for describing the embodiments or the prior art. Apparently, the accompanying drawings in the following description show some embodiments of the present disclosure, and a person of ordinary skill in the art may still derive other drawings from these accompanying drawings without creative efforts.

FIG. 7 is a schematic flowchart of Embodiment 3 of a crosstalk estimation method.

FIG. 10 is a schematic flowchart of Embodiment 6 of a crosstalk estimation method.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
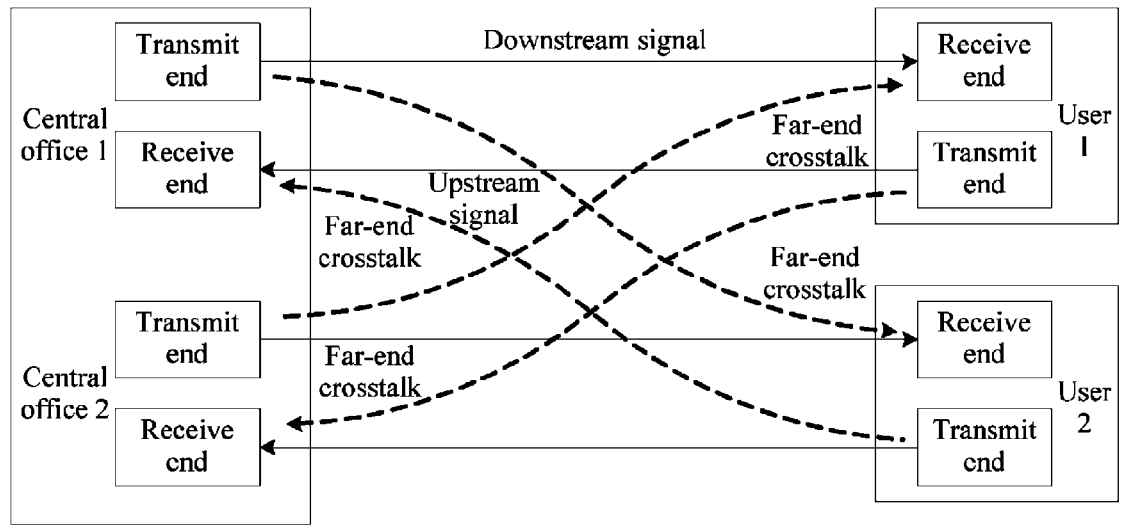
FIG. 1 is a schematic diagram of far-end crosstalk.
Figure 2:
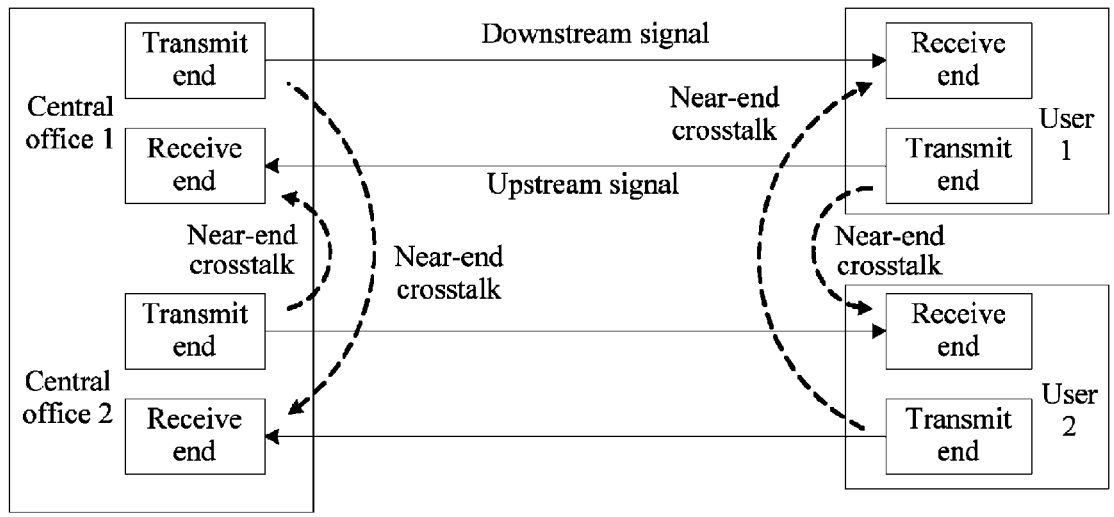
FIG. 2 is a schematic diagram of near-end crosstalk.
Figure 3:
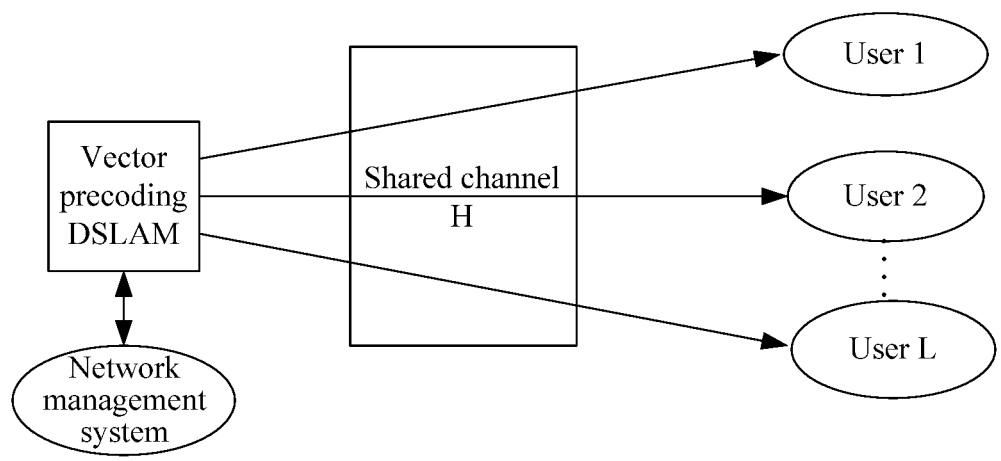
FIG. 3 shows a working scenario in which simultaneous transmission is performed at a DSLAM.
Figure 4:
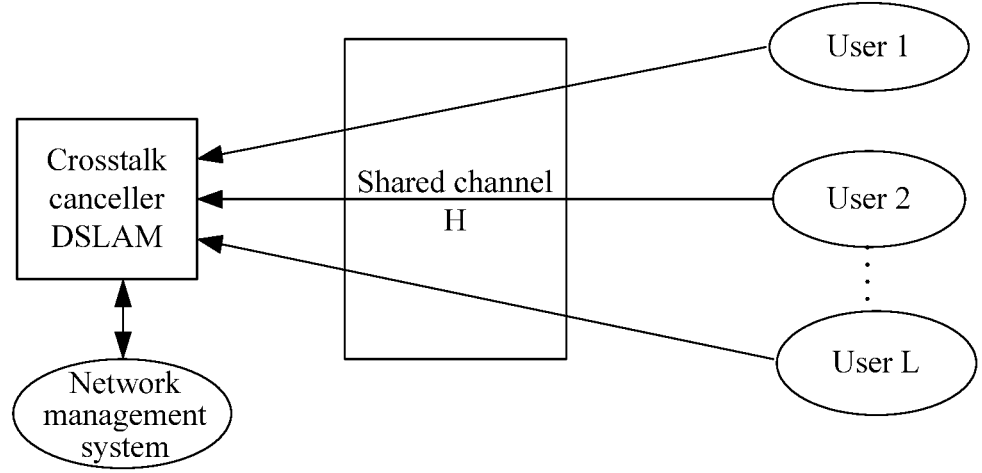
FIG. 4 shows a working scenario in which simultaneous reception is performed at a DSLAM.

In a vectored DSL system, joint transmission and reception may be performed at a DSLAM so as to cancel FEXT interference using a signal processing method. FIG. 3 shows a working scenario in which simultaneous transmission is performed at a DSLAM. FIG. 4 shows a working scenario in which simultaneous reception is performed at a DSLAM.

A shared channel H shown in FIG. 3 and FIG. 4 in the $k^{th}$ frequency range in a frequency domain may be expressed in a matrix form shown in an equation (1):

$$H = \begin{bmatrix} h_{11} & h_{12} & \ldots & h_{1M} \\ h_{21} & h_{22} & \ldots & h_{2M} \\ \vdots & \vdots & \ddots & \vdots \\ h_{M1} & h_{M2} & \ldots & h_{MM} \end{bmatrix}_{M \times M}, \qquad (1)$$

Where $h_{ij}$ represents a transmission equation from a line pair j to a line pair i, in an actual case, i and j are equal and are equal to a quantity of channels having a mutual crosstalk relationship among shared channels, which is set to M herein, and H is an M×M channel transmission matrix. Assuming that X represents an M×1 channel input vector, Y represents an M×1 channel output vector, and Z represents an M×1 noise vector, a channel transmission equation is expressed in an equation (2):

$$Y = HX + Z \qquad (2)$$

For the upstream, joint reception processing is performed for a signal at a CO, and a crosstalk canceller W is introduced into a receive end. A received signal is shown in an equation (3):

$$\tilde{Y} = WY = WHX + WZ \qquad (3)$$

When WH is a diagonal matrix, each component of the received signal is equal to a corresponding component of a transmitted signal multiplied by a coefficient, with a noise added. This eliminates impact from another component of the transmitted signal and therefore eliminates crosstalk.

For the downstream, joint transmission processing is performed for a signal at the CO and a pre-coder P is introduced to the CO. A transmitted signal may be expressed using an equation (4):

$$\tilde{X} = PX \qquad (4)$$

A signal received at the receive end may be expressed using an equation (5):

$$\tilde{Y} = H\tilde{X} + Z = HPX + Z \qquad (5)$$

Likewise, when HP is a diagonal matrix, crosstalk is eliminated.

The transmit end modulates a pilot sequence onto a synchronization symbol. The receive end receives a sample error on the synchronization symbol and sends the received sample error to a vectoring control entity (VCE). With the foregoing upstream and downstream joint processing, far-end crosstalk can be eliminated in the vectored DSL system.

However, the foregoing vectored DSL technique can only cancel mutual FEXT crosstalk between different users at a same frequency in a passband range. If 17a and 30a lines are both deployed in a vectored DSL system, that is, in a scenario in which an original VDSL2 17a 4 k symbol rate line coexists with a new 30a 4 k symbol rate line, because most current VDSL2 modulators (modem) all use 1× sampling, the original VDSL2 17a line still has an out-of-band spectrum out of 17 M. Although a low-pass filter is used, power of a 17-21 MHz out-of-band spectrum is still above −80 dBm/Hz. In a downstream direction, the out-of-band spectrum for signal transmission over the 17a line causes relatively strong FEXT interference to corresponding frequencies of the 30a line. On the other hand, the spectrum above 17 M of the 30a line also causes FEXT interference to the out-of-band spectrum of the 17a line. When a modem at a receive end of the 17a line uses 1× sampling, this part of out-of-band interference is aliased to the inband spectrum of the VDSL2 17a line, resulting in a decrease of a rate of the original VDSL2 17a line. For an upstream direction, a similar case may also be true.

It can be learned that the prior-art vectored DSL technique can cancel only in-passband crosstalk between a 17a line and a 30a line but not out-of-passband crosstalk between the 17a line and the 30a line, which affects effects and stability of FTTC acceleration.

A first line and a second line mentioned in the embodiments of the present disclosure may refer to any two lines respectively of two types of lines whose spectral ranges overlap. For example, the first line refers to one of lines whose profile is 30a and the second line refers to one of lines whose profile is 17a. Correspondingly, a transceiver at one end of the first line refers to a transceiver at a transmit end of the line and a transceiver at a peer end of the first line refers to a transceiver at a receive end of the line. Alternatively, a first line and a second line in the embodiments may be two types of lines whose spectral ranges overlap that of another line. For example, the first line refers to a type of line whose profile is 30a and the second line refers to a type of line whose profile is 17a. In this case, a transceiver at one end of the first line refers to a transceiver at a transmit end of any one of lines of the particular type and a transceiver at a peer end of the first line refers to a transceiver at a receive end of the same line of this type.

For ease of description, the embodiments of the present disclosure are described using an example in which the first line is a 30a line and the second line is a 17a line.

Figure 5:
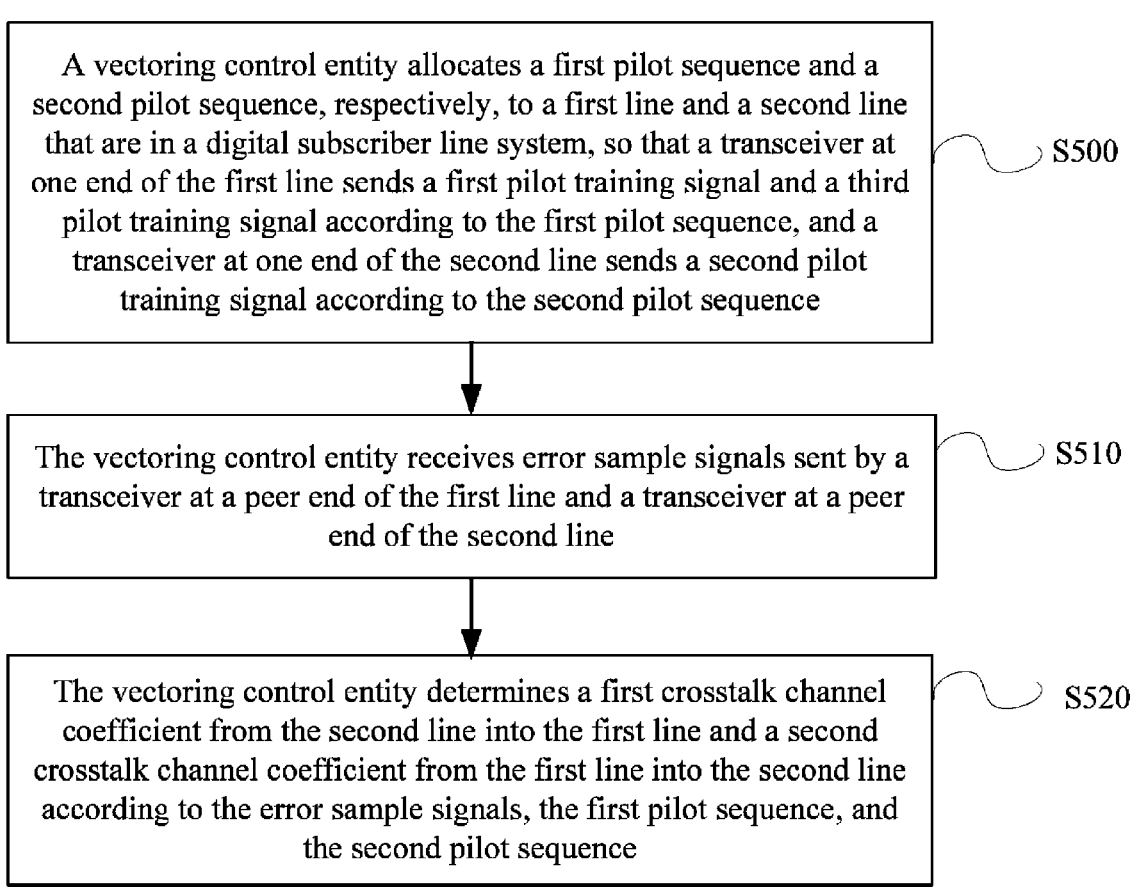
FIG. 5 is a schematic flowchart of Embodiment 1 of a crosstalk estimation method.

FIG. 5 is a schematic flowchart of Embodiment 1 of a crosstalk estimation method provided by the embodiments of the present disclosure. As shown in FIG. 5, the method includes the following steps.

S500. A vectoring control entity allocates a first pilot sequence and a second pilot sequence, respectively, to a first line and a second line that are in a system such that a transceiver at one end of the first line sends a first pilot training signal and a third pilot training signal according to the first pilot sequence, and a transceiver at one end of the second line sends a second pilot training signal according to the second pilot sequence.

The first pilot sequence and the second pilot sequence are mutually orthogonal. An out-of-band spectrum of the second line overlaps an inband spectrum of the first line. The first pilot training signal is a pilot training signal of the first line within an overlapping spectral range of the first line and the second line. The third pilot training signal is a pilot training signal of the first line out of the overlapping spectral range of the first line and the second line. The second pilot training signal is a pilot training signal of the second line within an inband spectral range. The first pilot training signal is orthogonal to the second pilot training signal. The third pilot training signal is orthogonal to an out-of-band mirror signal of the second pilot training signal.

In this embodiment of the present disclosure, the VCE in the vectored DSL system is a control entity of the entire vectored DSL system. In the DSLAM shown in FIG. 3 and FIG. 4, the VCE first generates a training pilot sequence matrix, for example, a Walsh matrix, according to a scale or a quantity of subscriber lines in the vectored DSL system. Subsequently, when a pilot sequence is allocated to each line, allocation may be directly performed based on the training pilot sequence matrix.

The first pilot sequence and the second pilot sequence are mutually orthogonal. The first pilot sequence and the second pilot sequence may be orthogonal pilot sequences or other pilot sequences that are mutually orthogonal, for example, sufficiently long pseudo-random sequences. In the embodiments of the present disclosure, that all pilot sequences are orthogonal pilot sequences is used as an example for description.

After receiving a pilot sequence, a transceiver at a transmit end of each line sends, to a peer end, a modulated signal of the pilot sequence, that is, the pilot training signal in this embodiment of the present disclosure. For an upstream signal, the transmit ends of the lines are user ends and each user end sends a pilot training signal to a DSLAM. For a downstream signal, the transmit ends of the lines are the DSLAM and a pilot training signal is sent to each user end using each subcarrier.

It should be noted that each line transceiver modulates a pilot sequence onto a synchronization symbol. That is, the pilot training signal in the embodiments of the present disclosure is carried in a synchronization symbol. In the embodiments of the present disclosure, the first pilot training signal and the third pilot training signal are used to distinguish between a pilot signal of the first line on the synchronization symbol within the overlapping spectral range of the first line and the second line and a pilot signal of the first line on the synchronization symbol out of the overlapping spectral range.

In the present disclosure, a pilot training signal generated and sent by a transceiver at a transmit end of each line is divided into a pilot training signal within an overlapping spectral range of the line and another line and a pilot training signal out of the overlapping spectral range. For example, for a 30a line and a 17a line, a spectral range of the 17a line is 0-17.6 MHz and a spectral range of the 30a line is 0-35.2 MHz. Therefore, a pilot training signal returned by the 30a line includes a first pilot training signal within a spectral range below 17.6 MHz and also includes a third pilot training signal within a spectral range of 17.6 MHz-35.2 MHz, and a pilot training signal returned by the 17a line is a second pilot training signal within a spectral range of 0-17.6 MHz. To enable that the first line can determine a crosstalk channel coefficient from the second line into the first line according to the first pilot training signal, the second pilot training signal, and the third pilot training signal, it needs to be ensured that the first pilot training signal within the overlapping spectral range of the second line and the first line is orthogonal to the second pilot training signal, and an out-of-band mirror signal of an inband training signal, obtained by means of sampling, of the second line is orthogonal to a pilot training signal overlapping an inband spectrum of the first line. The out-of-band mirror signal and the inband signal are in a conjugate symmetric relationship, that is, an out-of-band mirror signal of the second pilot training signal is orthogonal to the third pilot training signal.

S510. The vectoring control entity receives error sample signals sent by a transceiver at a peer end of the first line and a transceiver at a peer end of the second line.

The error sample signals are determined by the transceiver at the peer end of the first line and the transceiver at the peer end of the second line according to the received pilot training signals.

After a transceiver at a transmit end of a line sends a pilot training signal, reception is performed by a receive end of the line. When being transmitted on lines, signals cause far-end crosstalk between different lines. Therefore, there may be a particular difference between a signal received by a transceiver at the receive end and the signal sent by the transmit end. The transceiver at the receive end determines, according to the received pilot training signal, the pilot training signal sent by the transmit end, calculates a difference between the received signal and the transmitted signal to obtain an error sample signal, and sends the error sample signal to the VCE.

S520. The vectoring control entity determines a first crosstalk channel coefficient from the second line into the first line and a second crosstalk channel coefficient from the first line into the second line according to the error sample signals, the first pilot sequence, and the second pilot sequence.

Because a pilot training signal returned by each line to the VCE is generated according to a spectral overlapping status between the line and another line, the VCE can determine, by means of analysis, crosstalk channel coefficients from inband and out-of-band spectrums of one line to another line according to received error sample signals over the lines, for example, crosstalk channel coefficients from a inband spectrum of a 30a line into inband and out-of-band spectrums of a 17a line and a crosstalk channel coefficient from an out-of-band spectrum of the 17a line into an inband spectrum of the 30a line. The foregoing crosstalk channel coefficient may be, for example, a crosstalk cancellation matrix and a vector precoding matrix.

The VCE may calculate a first crosstalk channel matrix from the second line into the first line according to the feedback error sample signals returned by the first line and perform inverse matrix transformation on the first crosstalk channel matrix to obtain the first crosstalk channel coefficient, that is, a first precoding coefficient. Correspondingly, the VCE calculates a second crosstalk channel matrix from the first line into the second line according to a feedback error sample signal returned by the second line and performs inverse matrix transformation on the second crosstalk channel matrix to obtain the second crosstalk channel coefficient, that is, a second precoding coefficient.

The VCE performs precoding processing on to-be-sent data signals of lines according to the determined crosstalk cancellation matrix and vector precoding matrix such that far-end crosstalk between the lines can be eliminated. For example, for a 30a line, using the foregoing method, the VCE can eliminate crosstalk from an inband signal of a 17a line to the 30a line and can also eliminate crosstalk from a 17.6 MHz-35.2 MHz out-of-band spectrum of the 17a line to the 30a line.

According to the crosstalk estimation method provided in this embodiment of the present disclosure, a vectoring control entity can determine crosstalk channel coefficients between lines according to sample errors that are determined for the lines according to pilot training signals within different spectral ranges, and then perform precoding processing on to-be-sent data signals of the lines to eliminate impact of crosstalk between inband spectrums and out-of-band spectrums of the lines. This reduces impact on a line rate caused by inter-line crosstalk in a system in which lines of different profiles coexist, and further improves effects and stability of FTTC acceleration.

In the embodiments of the present disclosure, downstream crosstalk processing is used as an example for description. Processing in an upstream direction is similar.

In one possible implementation form of the foregoing embodiment, the third pilot training signal is a mirror signal of the first pilot training signal out of an overlapping spectral region of the first line and the second line.

It is assumed that a pilot training signal received over a 30a line at a frequency band of 0-17.6 MHz is $$Y_{4096-k}^{30a} = H_{4096-k}^{30a} \cdot X_{4096-k}^{30a} + H_{4096-k}^{30a,17a} \cdot X_{4096-k}^{17a} + Z_{4096-k}^{30a},$$

Where 4096−k, k=1, . . . , 4096 represents a subcarrier set of 0-17.6 MHz, $X_{4096-k}^{30a}$ represents a signal vector sent over the 30a line at 0-17.6 MHz, that is, a first pilot training signal vector, $X_{4096-k}^{17a}$ represents a signal vector sent over a 17a line at 0-17.6 MHz, $Z_{4096-k}^{30a}$ represents a background noise signal vector of the 30a line at 0-17.6 MHz, $H_{4096-k}^{30a}$ represents a channel matrix of the 30a line at 0-17.6 MHz, $H_{4096-k}^{30a,17a}$ represents a crosstalk channel matrix from the 17a line into the 30a line at 0-17.6 MHz in a VDSL2 system.

It is assumed that a signal vector sent over the 30a line at a frequency band of 17.6 MHz-35.2 MHz is $$Y_{4096+k}^{30a} = H_{4096+k}^{30a} \cdot X_{4096+k}^{30a} + H_{4096+k}^{30a,17a} \cdot (X_{4096-k}^{17a})^H + Z_{4096+k}^{30a},$$

Where 4096+k, k=1, . . . , 4096 represents a subcarrier set of 17.6 MHz-35.2 MHz, $X_{4096+k}^{30a}$ represents a signal vector sent over the 30a line at 17.6 MHz-35.2 MHz, that is, a second pilot training signal vector, $(X_{4096-k}^{17a})^H$ represents a mirror signal vector, at 17.6 MHz-35.2 MHz, of a signal vector sent over a 17a line at 0-17.6 MHz, $Z_{4096+k}^{30a}$ represents a background noise signal vector of the 30a line at 17.6 MHz-35.2 MHz, $H_{4096+k}^{30a}$ represents a channel matrix of the 30a at 17.6 MHz-35.2 MHz, $H_{4096+k}^{30a,17a}$ represents a crosstalk matrix from the 17a line into the 30a line in a range of 17.6 MHz-35.2 MHz in the system.

In a conventional pilot training signal, the signal vector $X_{4096-k}^{17a}$ sent over the 17a line in a frequency range of 0-17.6 MHz and the signal vector $X_{4096-k}^{30a}$ sent over the 30a line in the frequency range of 0-17.6 MHz are mutually orthogonal while $X_{4096+k}^{30a}$ and $(X_{4096-k}^{17a})^H$ are not orthogonal. Therefore, a crosstalk channel matrix and a precoding coefficient matrix of $H_{4096+k}^{30a,17a}$ cannot be obtained by means of training. If $X_{4096+k}^{30a} = (X_{4096-k}^{30a})^H$, $X_{4096+k}^{30a}$ is orthogonal to an out-of-band mirror signal $(X_{4096-k}^{17a})^H$ of the 17a line. That is, after the first line generates the first pilot training signal, conjugate symmetry is implemented for the first pilot training signal in a range of 17.6 MHz-35.2 MHz, to obtain the third pilot training signal.

In this embodiment, the signal vector $X_{4096-k}^{17a}$ sent over 17a in the frequency range of 0-17.6 MHz and the signal vector $X_{4096-k}^{30a}$ sent over 30a in the frequency range of 0-17.6 MHz are mutually orthogonal, the signal vector $X_{4096+k}^{30a}$ sent over 30a in the frequency range of 17.6 MHz-35.2 MHz and the mirror signal vector $(X_{4096-k}^{17a})^H$ of a signal sent over 17a in the frequency range of 17.6 MHz-35.2 MHz are mutually orthogonal. Therefore, the VCE can obtain, by means of training, the crosstalk channel matrix and the precoding coefficient matrix, that is, a crosstalk channel coefficient, of $H_{4096+k}^{30a,17a}$.

After determining the crosstalk channel coefficients between the 17a line and the 30a line in the vectored DSL system using the foregoing method, the VCE performs precoding processing on to-be-sent signals of the 17a line and the 30a line using the determined crosstalk channel coefficients to obtain crosstalk-cancelled to-be-sent signals of the 17a line and the 30a line.

Figure 6:
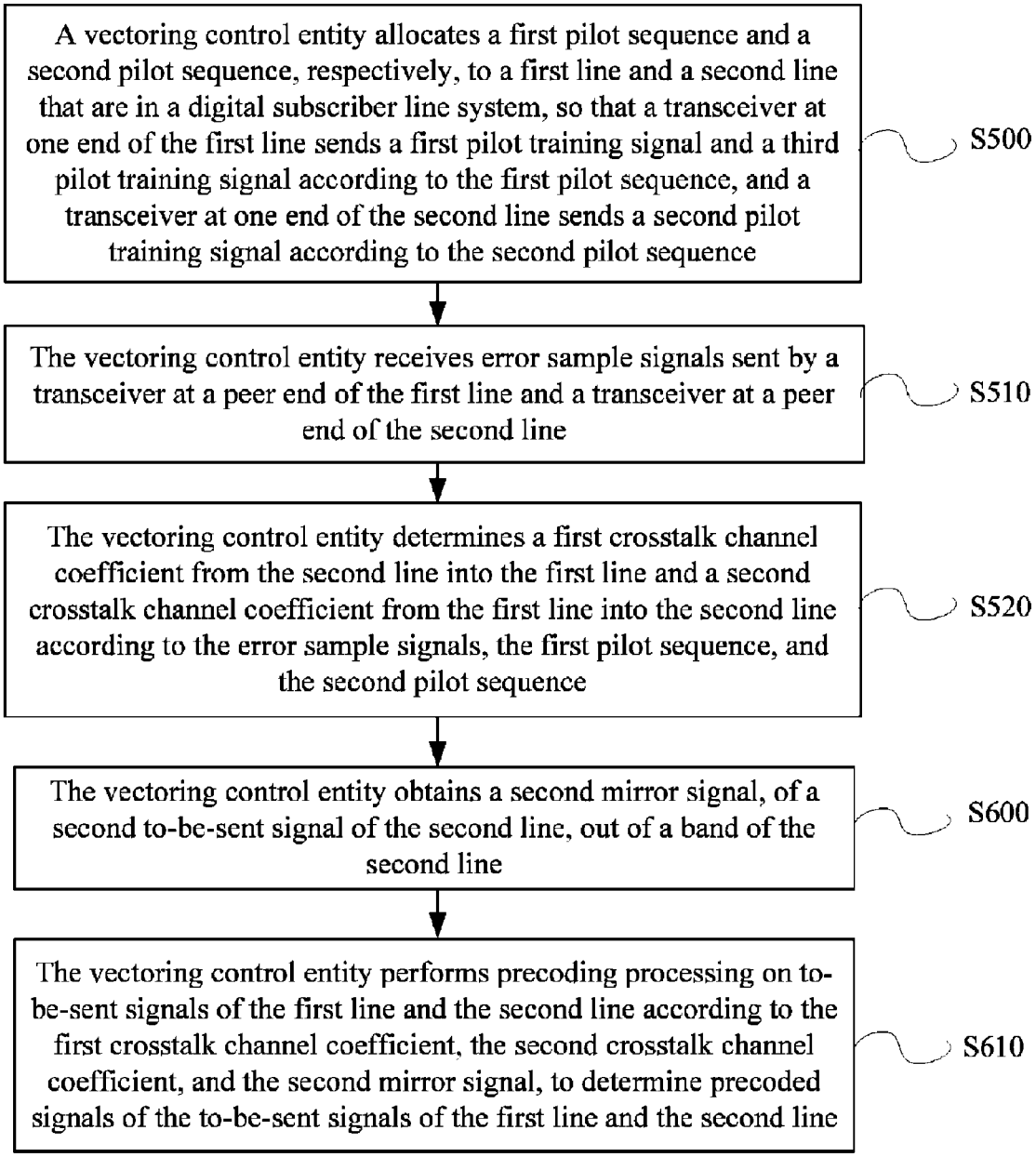
FIG. 6 is a schematic flowchart of Embodiment 2 of a crosstalk estimation method.

FIG. 6 is a schematic flowchart of Embodiment 2 of the crosstalk estimation method provided by the embodiments of the present disclosure. As shown in FIG. 6, based on the embodiment shown in FIG. 5 and after the foregoing S520, the method further includes the following steps.

S600. The vectoring control entity obtains a second mirror signal, of a second to-be-sent signal of the second line, out of a band of the second line.

After determining, using the foregoing method, a crosstalk channel coefficient from an inband signal of a 17a line into a 30a line within a range of 0-17.6 MHz and a crosstalk channel coefficient from an out-of-band mirror signal of the inband signal of the 17a line into the 30a line within a range of 17.6 MHz-30.2 MHz, the VCE needs to perform precoding processing on a to-be-sent data signal of the 30a line using the obtained crosstalk channel coefficients, to eliminate crosstalk from the 17a line to the 30a line during a signal transmission process. For that purpose, the 17a line may first generate an out-of-band mirror data signal $(X_{4096-k}^{17a})^H$ within the range of 17.6 MHz-30.2 MHz according to a to-be-sent data signal $X_{4096-k}^{17a}$ of the 17a line within the range of 0-17.6 MHz, and sends $X_{4096-k}^{17a}$ and $(X_{4096-k}^{17a})^H$ to the VCE, or the 17a line may directly send a to-be-sent data signal $X_{4096-k}^{17a}$ of the 17a line within the range of 0-17.6 MHz to the VCE, and the VCE generates $(X_{4096-k}^{17a})^H$ according to $X_{4096-k}^{17a}$. This is not limited by this embodiment.

S610. The vectoring control entity performs precoding processing on to-be-sent signals of the first line and the second line according to the first crosstalk channel coefficient, the second crosstalk channel coefficient, and the second mirror signal, to determine precoded signals of the to-be-sent signals of the first line and the second line.

Therefore, precoding-processed signals of the 17a line and the 30a line are shown in an equation (6)

$$\begin{pmatrix} \tilde{X}_{4096-k}^{17a} \\ \tilde{X}_{4096-k}^{30a} \\ \tilde{X}_{4096+k}^{30a} \end{pmatrix} = \begin{pmatrix} P_{4096-k}^{17a} & 0 & P_{4096-k}^{17a,30a} & 0 \\ P_{4096-k}^{30a,17a} & 0 & P_{4096-k}^{30a} & 0 \\ 0 & P_{4096+k}^{30a,17a} & 0 & P_{4096+k}^{30a} \end{pmatrix} \begin{pmatrix} X_{4096-k}^{17a} \\ (X_{4096-k}^{17a})^H \\ X_{4096-k}^{30a} \\ X_{4096+k}^{30a} \end{pmatrix}, \quad (6)$$

where $\tilde{X}_{4096-k}^{17a}$ is a precoding-processed signal of the 17a line, $\tilde{X}_{4096-k}^{30a}$ is a precoding-processed signal of the 30a line within the range of 0-17.6 MHz, $\tilde{X}_{4096+k}^{30a}$ is a precoding-processed signal of the 30a line within the range of 17.6 MHz-35.2 MHz, $P_{4096-k}^{17a}$ is a crosstalk channel coefficient, that is, a precoding coefficient, between 17a lines at 0-17.6 MHz, $P_{4096-k}^{17a,30a}$ is a precoding coefficient from the 30a line into the 17a line at 0-17.6 MHz, a precoding coefficient from the 17a line into the 30a line at 0-17.6 MHz, $P_{4096-k}^{30a}$ is a precoding coefficient between 30a lines at 0-17.6 MHz, $P_{4096-k}^{30a,17a}$ is a precoding coefficient from the 17a line into the 30a line at 17.6 MHz-35.2 MHz, and $P_{4096+k}^{30a}$ is a precoding coefficient between 30a lines at 17.6 MHz-35.2 MHz.

According to the spectrum crosstalk processing method provided in this embodiment, a vectoring control entity can determine crosstalk channel coefficients between lines according to sample errors that are determined for the lines according to pilot training signals within different spectral ranges, and then perform precoding processing on an obtained to-be-sent signal of a line and a mirror signal of the to-be-sent signal to eliminate impact of crosstalk between inband spectrums and out-of-band spectrums of the lines. This avoids a line rate decrease caused by inter-line crosstalk when lines of different profiles coexist in a system, and further improves effects and stability of FTTC acceleration.

In another possible implementation manner of this embodiment of the present disclosure, the VCE may as well determine the precoded signal of the to-be-sent signal of the 30a line without the need to obtain an out-of-band mirror signal of a to-be-sent data signal of the 17a line. FIG. 7 is a schematic flowchart of Embodiment 3 of the crosstalk estimation method provided by the embodiments of the present disclosure. As shown in FIG. 7, based on Embodiment 1 shown in FIG. 5, after S520, the method further includes the following steps.

S700. The vectoring control entity determines a first mirror coefficient of the first crosstalk channel coefficient.

The VCE implements conjugate symmetry for the first crosstalk channel coefficient to obtain the first mirror coefficient of the crosstalk channel coefficient.

S710. The vectoring control entity obtains a third mirror signal of a third to-be-sent signal of the first line.

The third to-be-sent signal is a to-be-sent signal of the first line out of an overlapping spectral range of the first line and the second line. The third mirror signal is a mirror signal of the third to-be-sent signal within the overlapping spectral range of the first line and the second line.

Similar to the process of obtaining, by the VCE, the second mirror signal of the second to-be-sent signal of the second line in the foregoing embodiment, the third mirror signal $(X_{4096+k}^{30a})^H$ of the third to-be-sent signal may be obtained after the 30a line implements conjugate symmetry for the to-be-sent data signal $X_{4096-k}^{30a}$ of the 30a line at 17.6 MHz-35.2 MHz and then sent to the VCE, or may be obtained after the 30a line sends the to-be-sent data signal $X_{4096+k}^{30a}$ of the 30a line at 17.6 MHz-35.2 MHz to the VCE and the VCE implements conjugate symmetry for $X_{4096+k}^{30a}$.

S720. The vectoring control entity performs precoding processing on to-be-sent signals of the first line and the second line according to the first crosstalk channel coefficient, the second crosstalk channel coefficient, the first mirror coefficient, and the third mirror signal, to determine a precoded signal of a first to-be-sent signal of the first line, a precoded signal of the third mirror signal, and a precoded signal of a second to-be-sent signal of the second line.

The first to-be-sent signal is a to-be-sent signal of the first line within the overlapping spectral range of the first line and the second line.

Therefore, precoded signals of to-be-sent signals of the 17a line and the 30a line are shown in an equation (7)

$$\begin{pmatrix} \tilde{X}_{4096-k}^{17a} \\ \tilde{X}_{4096-k}^{30a} \\ (\tilde{X}_{4096+k}^{30a})^H \end{pmatrix} = \begin{pmatrix} P_{4096-k}^{17a} & P_{4096-k}^{17a,30a} & 0 \\ P_{4096-k}^{30a,17a} & P_{4096-k}^{30a} & 0 \\ (P_{4096+k}^{30a,17a})^H & 0 & (P_{4096+k}^{30a})^H \end{pmatrix} \begin{pmatrix} X_{4096-k}^{17a} \\ X_{4096-k}^{30a} \\ (X_{4096+k}^{30a})^H \end{pmatrix}, \quad (7)$$

where $(P_{4096+k}^{30a})^H$ is a mirror coefficient of a crosstalk channel coefficient, that is, a mirror coefficient of a precoding coefficient, between 30a lines at 17.6 MHz-35.2 MHz, and $(P_{4096+k}^{30a,17a})^H$ is a mirror coefficient of a precoding coefficient from the 17a line into the 30a line at 17.6 MHz-35.2 MHz.

Afterwards, the VCE sends $\tilde{X}_{4096-k}^{17a}$ to the 17a line and sends $\tilde{X}_{4096-k}^{30a}$ and $(\tilde{X}_{4096+k}^{30a})^H$ to the 30a line, after the 30a line implements conjugate symmetry for $(\tilde{X}_{4096+k}^{30a})$, a to-be-sent signal of the 30a line within a spectral range of 17.6 MHz-35.2 MHz is obtained and then is sent out using a transmit end of the line.

According to the crosstalk estimation method provided in this embodiment of the present disclosure, after determining crosstalk channel coefficients between lines, a vectoring control entity implements conjugate symmetry for a crosstalk channel coefficient to obtain a mirror coefficient of the crosstalk channel coefficient, and then performs precoding processing on an obtained to-be-sent signal of a line and a mirror signal of the to-be-sent signal to eliminate impact of crosstalk between inband spectrums and out-of-band spectrums of the lines. This avoids a line rate decrease caused by inter-line crosstalk when lines of different profiles coexist in a system, and further improves effects and stability of FTTC acceleration.

For a 30a line, using the foregoing method can eliminate not only crosstalk from an inband signal of a 17a line to the 30a line but also crosstalk from an out-of-band signal of the 17a line to the 30a line. For a 17a line, using the foregoing method can eliminate crosstalk from an inband signal of a 30a line to the 17a line, and additionally crosstalk interference from a 17.6 MHz-35.2 MHz inband spectrum of the 30a line to an inband spectrum of the 17a line also needs to be eliminated.

It is assumed that a received signal vector of the 17a line at a frequency band of 0-17.6 MHz is $$\tilde{Y}_{4096-k}^{17a} = (H_{4096-k}^{17a} + (H_{4096+k}^{17a})^H) \cdot X_{4096-k}^{17a} + H_{4096-k}^{17a,30a} \cdot X_{4096-k}^{30a} + (H_{4096+k}^{17a,30a})^H \cdot (X_{4096+k}^{30a})^H + Z_{4096-k}^{17a},$$

where 4096−k,k=1, . . . , 4096 represents a subcarrier set of 0-17.6 MHz, $X_{4096-k}^{17a}$ represents a signal vector sent over the 17a line at 0-17.6 MHz, $X_{4096-k}^{30a}$ represents a signal vector sent over the 30a line at 0-17.6 MHz, $(X_{4096+k}^{30a})^H$ represents a mirror signal vector at 0-17.6 MHz of a signal vector sent over the 30a line at 17.6-35.2 MHz, $Z_{4096-k}^{17a}$ represents a background noise signal vector of the 17a line at 0-17.6 MHz, $H_{4096-k}^{17a}$ represents a channel matrix of the 17a line at 0-17.6 MHz, $(H_{4096+k}^{17a})^H$ represents a mirror channel matrix of a channel matrix of the 17a line at 17.6-35.2 MHz, $H_{4096-k}^{17a,30a}$ represents a crosstalk channel matrix from the 30a line into the 17a line at 0-17.6 MHz, and $(H_{4096+k}^{17a,30a})^H$ represents a crosstalk channel matrix from the 30a line into the 17a line at 17.6 MHz-30.2 MHz.

If a pilot training signal of the 30a line at 17.6 MHz-35.2 MHz and a pilot training signal of the 30a line at 0-17.6 MHz are conjugate symmetric, after the pilot training signal of the 30a line at 17.6 MHz-35.2 MHz is mirrored to within 17.6 MHz as out-of-band crosstalk, a mirror signal is the same as the pilot training signal of the 30a line at 0-17.6 MHz. Therefore, the 17a line cannot estimate a crosstalk channel of an interfering source. To prevent impact of the 30a line at 17.6 MHz-35.2 MHz on an out-of-band spectrum of the 17a line from being mirrored to interfere with an inband spectrum of the 17a line, it needs to be ensured that the first pilot training signal and the second pilot training signal are mutually orthogonal signals, and that the third pilot training signal and the second pilot training signal are mutually orthogonal signals. Therefore, after receiving a feedback error sample signal returned by the 17a line, the VCE can determine a second crosstalk channel coefficient from the 30a line into the 17a line, that is, a crosstalk channel coefficient from the 30a line into an inband spectrum of the 17a line at 0-17.6 MHz and a crosstalk channel coefficient from the 30a line into an out-of-band spectrum of the 17a line at 17.6 MHz-35.2 MHz.

Figure 8:
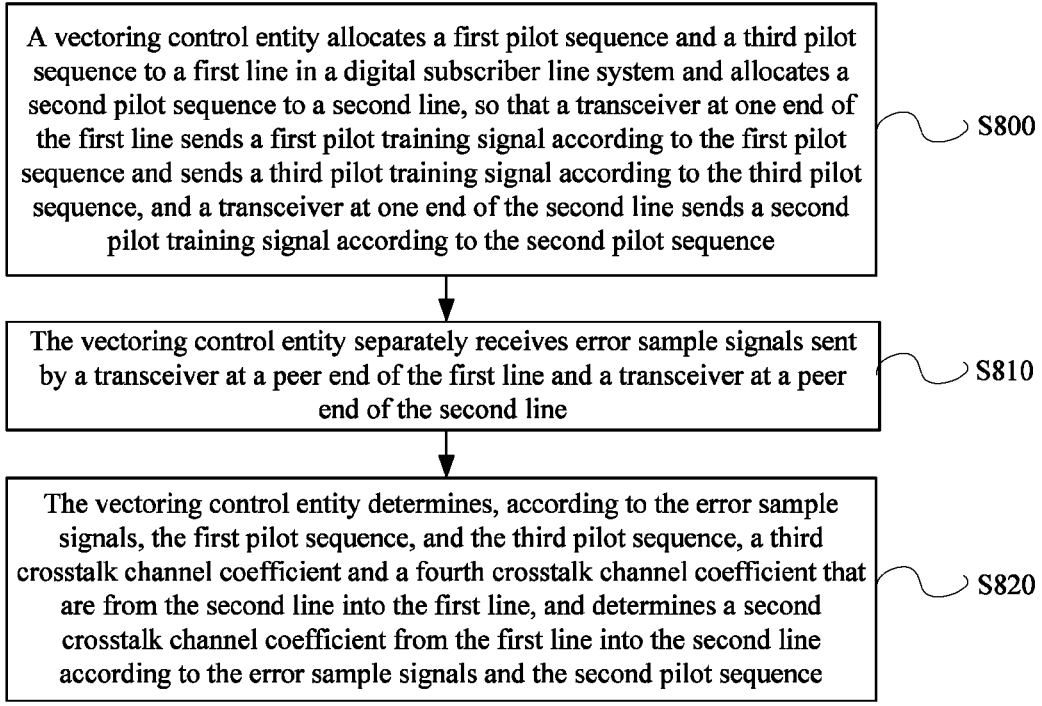
FIG. 8 is a schematic flowchart of Embodiment 4 of a crosstalk estimation method.

FIG. 8 is a schematic flowchart of Embodiment 4 of the crosstalk estimation method provided by the embodiments of the present disclosure. As shown in FIG. 8, to implement that the first pilot training signal and the second pilot training signal are mutually orthogonal signals, and that the third pilot training signal and the second pilot training signal are mutually orthogonal signals, the first pilot training signal, the second pilot training signal, and the third pilot training signal may be all made to be mutually orthogonal signals. As shown in FIG. 8, the crosstalk estimation method includes the following steps.

S800. The vectoring control entity allocates a first pilot sequence and a third pilot sequence to a first line in a digital subscriber line system and allocates a second pilot sequence to a second line such that a transceiver at one end of the first line sends a first pilot training signal according to the first pilot sequence and sends a third pilot training signal according to the third pilot sequence, and a transceiver at one end of the second line sends a second pilot training signal according to the second pilot sequence.

The foregoing first pilot sequence, second pilot sequence, and third pilot sequence are mutually orthogonal.

When allocating pilot sequences to lines, the VCE may directly select, from a training pilot sequence matrix, an appropriate quantity of pilot sequences to each line. When allocating a pilot sequence to the first line (30a), the VCE no longer allocates only one pilot sequence for all spectrums but allocates paired pilot sequences at all frequencies, and the paired pilot sequences are mutually orthogonal such that the 30a line modulates the paired pilot sequences onto some frequencies and the other frequencies that are of a synchronization symbol, respectively. For example, in a system in which 30a and 17a lines coexist and the 30a line and the 17a line have an overlapping spectral region, two pilot sequences making orthogonality hold are selected for the 30a line and still another pilot sequence is selected for the 17a line. Assuming that pilot sequences PS1 and PS2 are selected for the 30a line and a pilot sequence PS3 is selected for the 17a line, PS1, PS2, and PS3 make mutual orthogonality hold.

A VDSL transceiver unit (VTU) in the system supports reception of values of different pilot sequences and calculation of error sample signals, at different frequencies of a synchronization symbol.

To implement the foregoing way of working, a vectored DSL system needs to ensure for a downstream direction, a VDSL transceiver unit at a user end, or VDSL Transceiver Unit at the Remote (VTU-R) needs to support reception of values of different pilot sequences and calculation of error sample signals, at different frequencies of a synchronization symbol, for an upstream direction, at a handshake stage, a VDSL transceiver unit at a central office, or a VDSL Transceiver Unit at the Optical Network Unit (ONU) (VTU-O) and a VTU-R need to notify each other whether they support paired pilot sequences at upstream frequencies. One bit value in a notification may be used to indicate whether the VTU-O or the VTU-R supports paired pilot sequences at the upstream frequencies. For example, the bit value being 1 represents that the VTU-O or the VTU-R supports paired pilot sequences at the upstream frequencies and being 0 represents that the VTU-O or the VTU-R does not support paired pilot sequences at the upstream frequencies. For example, in the upstream direction, #0 and #1 are defined as two pilot sequences paired in frequency, and a transmit end of the 30a line modulates the pilot sequences #0 and #1 onto a non-overlapping subcarrier and an overlapping subcarrier that are of a synchronization symbol, respectively. To update the pilot sequences, the VTU-O sends a pilot update command to the VTU-R and transmits the pilot sequences #0 and #1 to the VTU-R, and the VTU-R sends a response message to the VTU-O such that the VTU-O learns whether the VTU-R has successfully updated the pilot sequences.

S810. The vectoring control entity separately receives error sample signals sent by a transceiver at a peer end of the first line and a transceiver at a peer end of the second line.

The error sample signals are determined by the transceiver at the peer end of the first line and the transceiver at the peer end of the second line according to the received pilot training signals.

For S810, reference may be made to S510 in the foregoing embodiment, and details are not described herein again.

S820. The vectoring control entity determines, according to the error sample signals, the first pilot sequence, and the third pilot sequence, a third crosstalk channel coefficient and a fourth crosstalk channel coefficient that are from the second line into the first line, and determines a second crosstalk channel coefficient from the first line into the second line according to the error sample signals and the second pilot sequence.

The foregoing third crosstalk channel coefficient is an inband crosstalk channel coefficient from the 30a line into the 17a line. The fourth crosstalk channel coefficient is an out-of-band crosstalk channel coefficient from the 30a line into the 17a line.

For the foregoing S810 and S820, reference may be made to specific descriptions of S510 and S520 in the foregoing Embodiment 1 of the crosstalk estimation method, and details are not described herein again.

After determining, using the foregoing method, an inband crosstalk channel coefficient and an out-of-band crosstalk channel coefficient that are between the first line and the second line, the VCE then performs precoding processing on to-be-sent data signals of the first line and the second line, which can eliminate not only crosstalk from an out-of-band spectrum of the second line to an inband spectrum of the first line, but also a mirror signal of crosstalk from the inband spectrum of the first line to an inband spectrum of the second line. For example, in a system in which 17a and 30a lines coexist, after precoding processing is performed on to-be-sent data signals of the 17a line and the 30a line using crosstalk channel coefficients between the 17a line and the 30a line that are determined using the foregoing method, a precoded signal of a to-be-sent signal of the 17a line can be obtained, with impact on the 17a line after an out-of-band spectrum of the 30a line at 17.6 MHz-35.2 MHz is mirrored to 0-17.6 MHz eliminated.

Therefore, precoded signals determined by the VCE for the 17a line and the 30a line are shown in an equation (8)

$$\begin{pmatrix} \tilde{X}_{4096-k}^{17a} \\ \tilde{X}_{4096-k}^{30a} \\ (\tilde{X}_{4096+k}^{30a})^H \end{pmatrix} = \begin{pmatrix} P_{4096-k}^{17a} & P_{4096-k}^{17a,30a} & (P_{4096+k}^{17a,30a})^H \\ P_{4096-k}^{30a,17a} & P_{4096-k}^{30a} & 0 \\ 0 & 0 & (P_{4096+k}^{30a})^H \end{pmatrix} \begin{pmatrix} X_{4096-k}^{17a} \\ X_{4096-k}^{30a} \\ (X_{4096+k}^{30a})^H \end{pmatrix} \quad (8)$$

According to the crosstalk estimation method provided in this embodiment of the present disclosure, a vectoring control entity can determine crosstalk channel coefficients between lines according to sample errors that are determined for the lines according to pilot training signals within different spectral ranges, and then perform precoding processing on to-be-sent data signals of the lines to eliminate impact of crosstalk between inband spectrums and out-of-band spectrums of the lines. This avoids a line rate decrease caused by inter-line crosstalk when lines of different profiles coexist in a system, and further improves effects and stability of FTTC acceleration.

Figure 9:
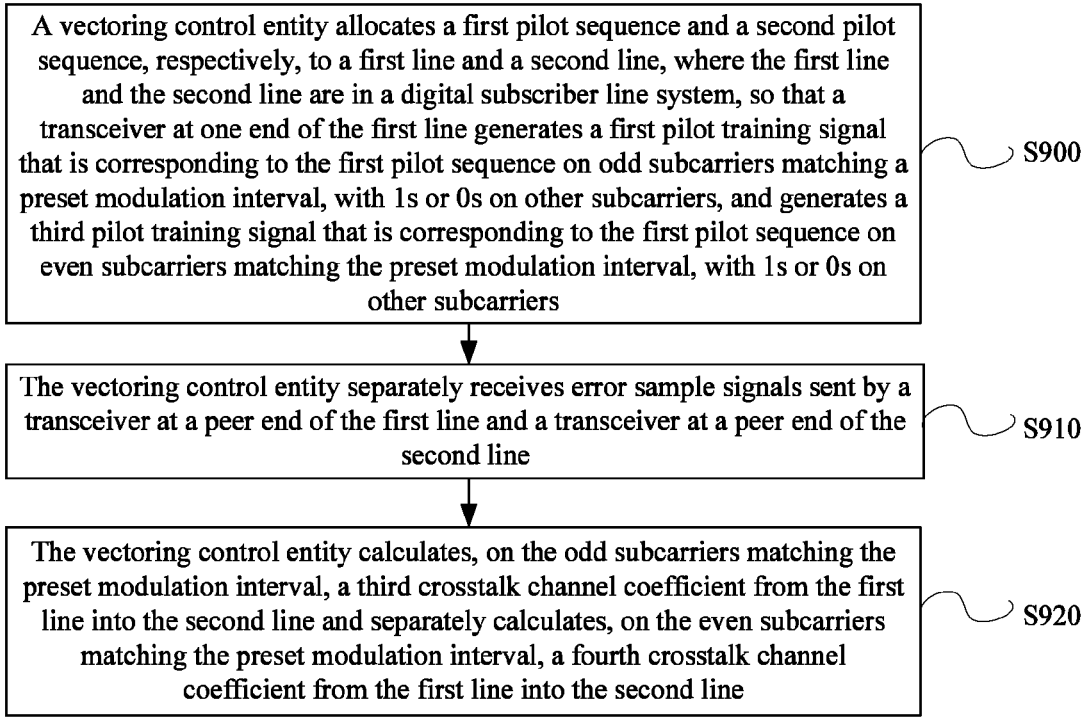
FIG. 9 is a schematic flowchart of Embodiment 5 of a crosstalk estimation method.

However, in the foregoing method in which the VCE allocates multiple pilot sequences to a line whose spectrum overlaps that of another line, when spectrums of multiple lines overlap with each other in a system, a quantity of pilot sequences increases, and the pilot sequences become longer. As a result, time spent by the VCE in training the pilot sequences increases a lot, and therefore the entire crosstalk cancellation processing process also becomes longer, affecting user experience. To reduce the crosstalk cancellation processing time as much as possible, FIG. 9 is a schematic flowchart of Embodiment 5 of the crosstalk estimation method provided by the embodiments of the present disclosure. To implement that the first pilot training signal and the second pilot training signal are mutually orthogonal signals, and that the third pilot training signal and the second pilot training signal are mutually orthogonal signals, as shown in FIG. 9, the crosstalk estimation method includes the following steps.

S900. A vectoring control entity allocates a first pilot sequence and a second pilot sequence, respectively, to a first line and a second line, where the first line and the second line are in a digital subscriber line system such that a transceiver at one end of the first line generates a first pilot training signal that corresponds to the first pilot sequence on odd subcarriers matching a preset modulation interval, with 1s or 0s on other subcarriers, and generates a third pilot training signal that corresponds to the first pilot sequence on even subcarriers matching the preset modulation interval, with 1s or 0s on other subcarriers.

The first pilot sequence and the second pilot sequence are mutually orthogonal. The preset modulation interval is an integer multiple of 2. For example, a modulation interval used by the first line is 2. Then, for the first pilot training signal generated by the first line, a pilot value on each odd subcarrier corresponds to a pilot sequence and pilot values on other subcarriers are all 1s or 0s. For the generated third pilot training signal, a pilot value on each even subcarrier corresponds to a pilot sequence and pilot values on other subcarriers are all 1s or 0s. If a modulation interval used by the first line is 4, a pilot sequence is modulated onto subcarriers 1, 5, 9 and so on of the first pilot training signal generated by the first line, and a pilot sequence of 1s or 0s are modulated onto other subcarriers such as subcarriers 2, 3, 4, 6, 7, and 8, and a pilot sequence is modulated onto subcarriers, 2, 6, 10 and so on of the third pilot training signal, and a pilot sequence of 1s or 0s is modulated onto other subcarriers such as subcarriers 1, 3, 4, 5, 7, 8, and 9.

That is, in a system in which 30a and 17a lines coexist, within an overlapping spectral range of the 30a line and the 17a line, the 30a line modulates, according to a preset modulation interval, a first pilot sequence onto odd subcarriers of a synchronization symbol that match the preset modulation interval, and modulates a pilot sequence whose pilot values are all 1s or 0s onto other subcarriers of the synchronization symbol. Out of the overlapping spectral range of the 30a line and the 17a line, the first pilot sequence is modulated onto even subcarriers of a synchronization symbol that match the preset modulation interval, and a pilot sequence whose pilot values are all 1s or 0s is modulated onto other subcarriers of the synchronization symbol.

Alternatively, in another implementation manner of S900, after receiving the first pilot sequence allocated by the VCE, the transceiver at the one end of the first line may generate a first pilot training signal that corresponds to the first pilot sequence on even subcarriers matching a preset modulation interval, with 1s or 0s on other subcarriers, and generate a third pilot training signal that corresponds to the first pilot sequence on odd subcarriers matching the preset modulation interval, with 1s or 0s on other subcarriers.

That is, in a system in which 30a and 17a lines coexist, within an overlapping spectral range of the 30a line and the 17a line, the 30a line modulates a first pilot sequence onto even subcarriers of a synchronization symbol that match a preset modulation interval, and modulates a pilot sequence whose pilot values are all 1s or 0s onto other subcarriers of the synchronization symbol. Out of the overlapping spectral range of the 30a line and the 17a line, the first pilot sequence is modulated onto odd subcarriers of a synchronization symbol that match the preset modulation interval, and a pilot sequence whose pilot values are all 1s or 0s is modulated onto other subcarriers of the synchronization symbol.

It should be noted that in the foregoing system, to implement such way of working, a flag mode of a synchronization symbol in the system supports flagging on odd or even subcarriers and a flagging interval is an integer multiple of 2.

For a downstream direction, a flag mode of a downstream synchronization symbol needs to support flagging on odd or even subcarriers within an overlapping spectral range of the 30a line and the 17a line with a flagging interval being an integer multiple of 2, and support flagging on even or odd subcarriers out of the overlapping spectral range of the 30a line and the 17a line with a flagging interval being an integer multiple of 2. For an upstream direction, at a handshake stage, a VTU-O and a VTU-R need to notify each other whether they support the foregoing different pilot sequences on odd and even frequencies. For example, it is defined that a flag bit being 1 indicates support and being 0 indicates no support. Then, at the handshake stage, the bit in a notification sent by the VTU-R to the VTU-O being 1 and the bit in a notification sent by the VTU-O to the VTU-R also being 1 indicate that both the VTU-R and the VTU-O support the foregoing different pilot sequences on odd and even frequencies, and that a flag mode of an upstream synchronization symbol supports flagging on odd or even subcarriers within the overlapping spectral range of the 30a line and the 17a line with a flagging interval being an integer multiple of 2, and supports flagging on even or odd subcarriers out of the overlapping spectral range of the 30a line and the 17a line with a flagging interval being an integer multiple of 2. For example, the first pilot sequence is separately modulated onto 2n+1-indexed subcarriers within the overlapping spectral range of the 30a line and the 17a line and 2n-indexed subcarriers out of the overlapping spectral range of the 30a line and the 17a line. When a pilot sequence is to be updated, the VTU-O sends a pilot update command to the VTU-R and transmits a pilot sequence in the foregoing form to the VTU-R, and the VTU-R sends a message as a response to the VTU-O indicating whether the update succeeds.

If the 30a line generates, by means of modulation, a pilot training signal, that is, a synchronization signal, in the foregoing manner, after a signal of the 30a line within a range of 17.6 MHz-35.2 MHz is mirrored as crosstalk to 0-17.6 MHz of the 17a line, a mirror signal is mutually orthogonal to a signal of the 17a line at 0-17.6 MHz.

S910. The vectoring control entity separately receives error sample signals sent by a transceiver at a peer end of the first line and a transceiver at a peer end of the second line.

The error sample signals are determined by the transceiver at the peer end of the first line and the transceiver at the peer end of the second line according to the received pilot training signals.

S920. The vectoring control entity calculates, on the odd subcarriers matching the preset modulation interval, a third crosstalk channel coefficient from the first line into the second line and separately calculates, on the even subcarriers matching the preset modulation interval, a fourth crosstalk channel coefficient from the first line into the second line.

The foregoing third crosstalk channel coefficient is an inband crosstalk channel coefficient from the 30a line into the 17a line. The fourth crosstalk channel coefficient is an out-of-band crosstalk channel coefficient from the 30a line into the 17a line.

Crosstalk channel coefficients determined by the VCE using the foregoing method are merely crosstalk channel coefficients on odd or even subcarriers. A crosstalk channel coefficient on all subcarriers is then obtained by means of interpolation.

Alternatively, if the 30a line generates pilot training signals in the other implementation manner of S900, S920 is correspondingly the vectoring control entity separately calculates, on even subcarriers matching a preset modulation interval, a third crosstalk channel coefficient from the first line into the second line and separately calculates, on odd subcarriers matching the preset modulation interval, a fourth crosstalk channel coefficient from the first line into the second line.

Generally, there are quite many lines of different profiles in a vectored DSL system. To further accelerate vector training, the foregoing method may further be used in combination with a frequency dependent pilot sequence (FDPS) in the G993.5 standard.

Further, in one possible implementation form of this embodiment of the present disclosure, the system includes N lines, the N lines are evenly classified into M groups of lines, and the M groups of lines each include a first line and a second line. Then, another possible implementation form of S900 is the vectoring control entity allocates a first pilot sequence and a second pilot sequence, respectively, to the first line and the second line that are in the system such that a transceiver at one end of any first line in the M groups uses a 2M interval to separately generate a first pilot training signal that corresponds to the first pilot sequence on subcarriers 2M+1, 2M+3, 2M+5, . . . , and 2M+(2M−1) with 1s or 0s on subcarriers 2M+2, 2M+4, 2M+6, . . . , and 2M+2M, and a third pilot training signal that corresponds to the first pilot sequence on subcarriers 2M+2, 2M+4, 2M+6, . . . , and 2M+2M with 1s or 0s on subcarriers 2M+1, 2M+3, 2M+5, . . . and 2M+(2M−1).

Alternatively, the following two pilot training signals are generated a first pilot training signal that corresponds to the first pilot sequence on subcarriers 2M+2, 2M+4, 2M+6, ..., and 2M+2M with 1s or 0s on subcarriers 2M+1, 2M+3, 2M+5, ..., and 2M+(2M−1), and a third pilot training signal that corresponds to the first pilot sequence on subcarriers 2M+1, 2M+3, 2M+5, ..., and 2M+(2M−1) with 1s or 0s on subcarriers 2M+2, 2M+4, 2M+6, ..., and 2M+2M.

Correspondingly, S920 is the vectoring control entity separately calculates, on the subcarriers 2M+1, 2M+3, 2M+5, ..., and 2M+(2M−1), a third crosstalk channel coefficient from the first line in the M groups into a second line in the M groups, and separately calculates, on the subcarriers 2M+2, 2M+4, 2M+5, ..., and 2M+2M, a fourth crosstalk channel coefficient from the first line in the M groups into the second line in the M groups. Alternatively, S920 is the vectoring control entity separately calculates, on the subcarriers 2M+2, 2M+4, 2M+6, ..., and 2M+2M, a third crosstalk channel coefficient from the first line in the M groups into a second line in the M groups, and separately calculates, on the subcarriers from 2M+1, 2M+3, 2M+5, ..., and 2M+(2M−1), a fourth crosstalk channel coefficient from the first line in the M groups into the second line in the M groups.

For example, if there are 256 lines in the foregoing system, the VCE classifies the lines into four groups and each group has 64 lines. Then, the VCE uses a set of pilot sequences of a length being 64 for each group but the pilot sequences are modulated onto different subcarriers. For example, in a spectral overlapping region of a 17a line and a 30a line, pilot sequences of the lines are modulated onto subcarriers whose indexes are 8n+1, 8n+3, 8n+5, and 8n+7, respectively, and out of the spectral overlapping region of the 17a line and the 30a line, pilot sequences of the lines are modulated onto subcarriers whose indexes are 8n+2, 8n+4, 8n+6, and 8n+8, respectively.

Alternatively, in a spectral overlapping region of a 17a line and a 30a line, pilot sequences of the lines are modulated onto subcarriers whose indexes are 8n+2, 8n+4, 8n+6, and 8n+8, respectively, and out of the spectral overlapping region of the 17a line and the 30a line, pilot sequences of the lines are modulated onto subcarriers whose indexes are 8n+1, 8n+3, 8n+5, and 8n+7, respectively.

Therefore, when performing crosstalk channel coefficient estimation according to error sample signals, the VCE needs to estimate, according to error sample signals of the odd subcarriers 8n+1, 8n+3, 8n+5, and 8n+7, crosstalk channel coefficients from 30a lines in the first, second, third, and fourth groups into an inband spectrum of all 17a lines, respectively, and estimate, according to error sample signals of the even subcarriers 8n+2, 8n+4, 8n+6, and 8n+8, crosstalk channel coefficients from the 30a lines in the first, second, third, and fourth group into an out-of-band spectrum of all 17a lines. Alternatively, the VCE estimates, according to error sample signals of the odd subcarriers 8n+1, 8n+3, 8n+5, and 8n+7, crosstalk channel coefficients from 30a lines in the first, second, third, and fourth group into an out-of-band spectrum of all 17a lines, respectively, and estimates, according to error sample signals of the even subcarriers 8n+2, 8n+4, 8n+6, and 8n+8, crosstalk channel coefficients from the 30a lines in the first, second, third, and fourth group into an inband spectrum of all 17a lines, respectively. Finally, inband and out-of-band crosstalk channel coefficients from the 30a lines in all groups into the 17a lines on all subcarriers are obtained by means of interpolation.

According to the crosstalk estimation method provided in this embodiment, a vectoring control entity determines crosstalk channel coefficients between inband spectrums and out-of-band spectrums of lines according to sample errors of the lines, and then performs precoding processing on to-be-sent data signals of the lines to eliminate impact of crosstalk between inband spectrums and out-of-band spectrums of the lines. This avoids a line rate decrease caused by inter-line crosstalk when lines of different profiles coexist in a system, and further improves effects and stability of FTTC acceleration.

FIG. 10 is a schematic flowchart of Embodiment 6 of the crosstalk estimation method provided by the embodiments of the present disclosure. As shown in FIG. 10, after S920, the method further includes the following steps.

S101. The vectoring control entity determines a fourth mirror coefficient of the fourth crosstalk channel coefficient within an overlapping spectral range of the first line and the second line.

Assuming that a crosstalk channel coefficient, that is, a precoding coefficient, which is from a 30a line into an out-of-band spectrum of a 17a line and determined according to error sample signals by the VCE is $P_{4096+k}^{17a,30a}$ coefficient $(P_{4096-k}^{17a,30a})^H$ being conjugate symmetric with the precoding coefficient is obtained after conjugate symmetry is implemented for the precoding coefficient.

S102. The vectoring control entity obtains a third mirror signal of a third to-be-sent signal of the first line.

The third to-be-sent signal is a to-be-sent signal of the first line out of an overlapping spectral range of the first line and the second line. The third mirror signal is a mirror signal of the third to-be-sent signal within the overlapping spectral range of the first line and the second line.

For S102, reference may be made to detailed descriptions of S710 in the foregoing embodiment and details are not described herein again.

S103. The vectoring control entity performs precoding processing on to-be-sent signals of the first line and the second line according to the second crosstalk channel coefficient, the third crosstalk channel coefficient, the fourth crosstalk channel coefficient, the fourth mirror coefficient, and the third mirror signal, to determine a precoded signal of a first to-be-sent signal of the first line, a precoded signal of the third to-be-sent signal, and a precoded signal of a second to-be-sent signal of the second line.

The first to-be-sent signal is a to-be-sent signal of the first line within the overlapping spectral range of the first line and the second line. The third to-be-sent signal is a to-be-sent signal of the first line out of the overlapping spectral range of the first line and the second line.

It should be noted that S101-S103 in this embodiment may also be S800 to S820.

According to the spectrum crosstalk processing method provided in this embodiment, a vectoring control entity determines crosstalk channel coefficients between inband spectrums and out-of-band spectrums of lines according to sample errors of the lines, and then performs precoding processing on to-be-sent data signals of the lines to eliminate impact of crosstalk between inband spectrums and out-of-band spectrums of the lines. This avoids a line rate decrease caused by inter-line crosstalk when lines of different profiles coexist in a system, and further improves effects and stability of FTTC acceleration.

Figure 11:
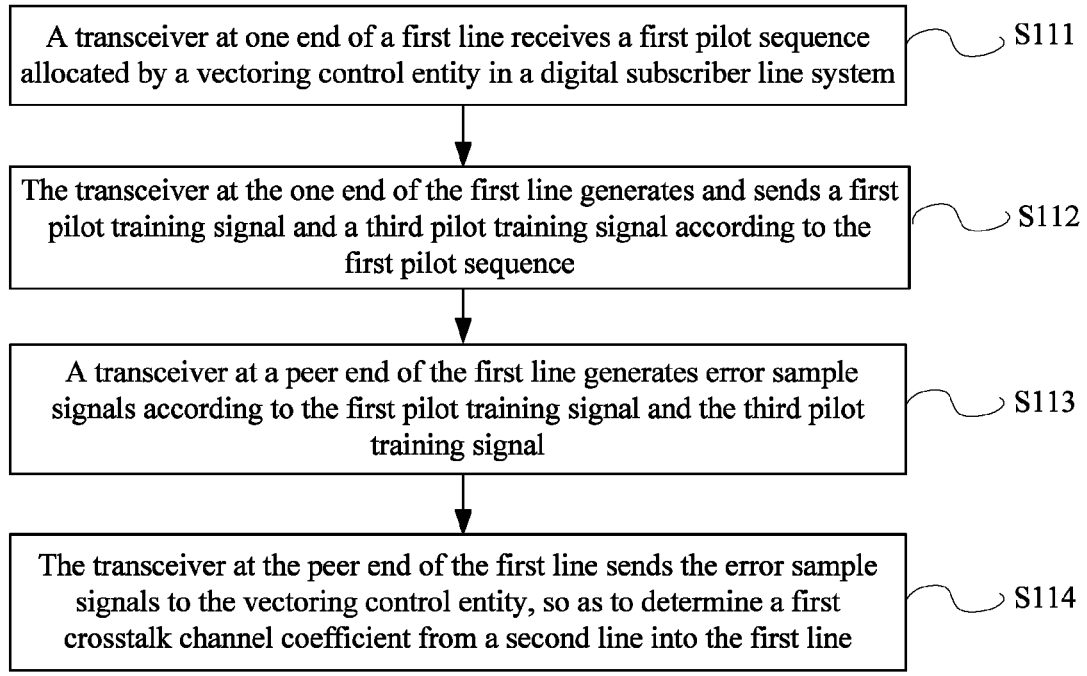
FIG. 11 is a schematic flowchart of Embodiment 7 of a crosstalk estimation method.

FIG. 11 is a schematic flowchart of Embodiment 7 of the crosstalk estimation method provided by the embodiments of the present disclosure. As shown in FIG. 11, the crosstalk estimation method includes the following steps.

S111. A transceiver at one end of a first line receives a first pilot sequence allocated by a vectoring control entity in a digital subscriber line system.

The first line and the second line mentioned in the embodiments of the present disclosure may refer to any two lines respectively of two types of lines whose spectral ranges overlap. For example, the first line refers to one of lines whose profile is 30a and the second line refers to one of lines whose profile is 17a. Correspondingly, a transceiver at one end of the first line refers to a transceiver at a transmit end of the line and a transceiver at a peer end of the first line refers to a transceiver at a receive end of the line. Alternatively, the first line and the second line in the embodiments may be two types of lines whose spectral ranges overlap that of another line. For example, the first line refers to a type of line whose profile is 30a and the second line refers to a type of line whose profile is 17a. In this case, a transceiver at one end of the first line refers to a transceiver at a transmit end of any one of lines of the particular type and a transceiver at a peer end of the first line refers to a transceiver at a receive end of the same line of this type.

For ease of description, the embodiments of the present disclosure are described using an example in which the first line is a 30a line and the second line is a 17a line.

The transceiver at the one end of the first line refers to a transceiver at a transmit end of the line. For an upstream signal, the transmit ends of the lines are user ends and each user end sends a pilot training signal to a DSLAM. For a downstream signal, the transmit ends of the lines are the DSLAM and a pilot training signal is sent to each user end using each subcarrier.

S112. The transceiver at the one end of the first line generates and sends a first pilot training signal and a third pilot training signal according to the first pilot sequence.

The first pilot training signal is a pilot training signal of the first line within an overlapping spectral range of the first line and the second line. The third pilot training signal is a pilot training signal of the first line out of the overlapping spectral range of the first line and the second line. An out-of-band spectrum of the second line overlaps an inband spectrum of the first line.

After receiving a pilot sequence allocated by the VCE, a transceiver at a transmit end of a 30a line separately modulates the first pilot sequence onto 0-17.6 MHz subcarriers and 17.6 MHz-35.2 MHz subcarriers of a synchronization symbol and generates the first pilot training signal and the third pilot training signal.

S113. A transceiver at a peer end of the first line generates error sample signals according to the first pilot training signal and the third pilot training signal.

A peer end of a line refers to a receive end of the line. For an upstream signal, a receive end of each line is a DSLAM. For a downstream signal, a receive end of each line is a user end.

After the transceiver at the receive end of the 30a line receives the pilot training signals sent by the transmit end of the 30a line, because signals cause far-end crosstalk between different lines when being transmitted on lines, there may be a particular difference between a signal received at the receive end and the signal sent by the transmit end. The receive end determines, according to the received pilot training signals, the pilot training signals sent by the transmit end, calculates differences between the received signals and the transmitted signals to obtain the error sample signals.

S114. The transceiver at the peer end of the first line sends the error sample signals to the vectoring control entity to determine a first crosstalk channel coefficient from the second line into the first line.

The 30a line sends the error sample signals to the VCE. The VCE may calculate a first crosstalk channel matrix from the second line into the first line according to the feedback error sample signals returned by the first line and perform inverse matrix transformation on the first crosstalk channel matrix to obtain the first crosstalk channel coefficient, that is, a precoding coefficient.

The VCE performs precoding processing on to-be-sent data signals of lines according to the determined precoding coefficient such that far-end crosstalk between the lines can be eliminated. For example, for a 30a line, using the foregoing method, the VCE can eliminate not only crosstalk from an inband signal of a 17a line to the 30a line but also crosstalk from a 17.6 MHz-35.2 MHz out-of-band spectrum of the 17a line to the 30a line.

According to the crosstalk estimation method provided in this embodiment of the present disclosure, a transceiver of a first line generates, according to a pilot sequence allocated by a vectoring control entity, pilot training signals within different spectral ranges and further determines sample errors. Therefore, the vectoring control entity can determine crosstalk channel coefficients from a second line into the first line, and perform precoding processing on a to-be-sent data signal of the first line to eliminate impact of crosstalk from the second line to inband and out-of-band spectrums of the first line. This reduces impact on a line rate caused by inter-line crosstalk in a system in which lines of different profiles coexist, and further improves effects and stability of FTTC acceleration.

It can be understood that precoding processing on a to-be-sent signal of the second line may also be implemented using the same method.

In one possible implementation form of this embodiment, S114 includes the transceiver at the peer end of the first line sends the error sample signals to the vectoring control entity such that the vectoring control entity determines the first crosstalk channel coefficient from the second line into the first line according to the error sample signals, the first pilot sequence, and a second pilot sequence.

The second pilot sequence is a pilot sequence allocated by the vectoring control entity to the second line, the first pilot training signal is orthogonal to a second pilot training signal generated by a transceiver at one end of the second line according to the second pilot sequence, and the third pilot training signal is orthogonal to an out-of-band mirror signal of the second pilot training signal.

Because a pilot training signal returned by each line to the VCE is generated according to a spectral overlapping status between the line and another line, the VCE can determine, by means of analysis, crosstalk channel coefficients between inband spectrums and out-of-band spectrums of lines according to received error sample signals on the lines and the pilot sequences allocated to the lines.

In another possible implementation form of this embodiment, the third pilot training signal is a mirror signal of the first pilot training signal out of an overlapping spectral region of the first line and the second line.

The crosstalk estimation method in this embodiment interacts with Embodiment 1 of the crosstalk estimation method. For related detailed descriptions, reference may be made to related descriptions in Embodiment 1 of the crosstalk estimation method and details are not described herein again.

For a 30a line, using the foregoing method can eliminate not only crosstalk from an inband signal of a 17a line to the 30a line but also crosstalk from an out-of-band signal of the 17a line to the 30a line. For a 17a line, using the foregoing method can eliminate crosstalk from an inband signal of a 30a line to the 17a line, and additionally crosstalk interference from a 17.6 MHz-35.2 MHz inband spectrum of the 30a line to an inband spectrum of the 17a line also needs to be eliminated.

If a pilot training signal of the 30a line at 17.6 MHz-35.2 MHz and a pilot training signal of the 30a line at 0-17.6 MHz are conjugate symmetric, after the pilot training signal of the 30a line at 17.6 MHz-35.2 MHz is mirrored to within 17.6 MHz as out-of-band crosstalk, a mirror signal is the same as the pilot training signal of the 30a line at 0-17.6 MHz. Therefore, the 17a line cannot estimate a crosstalk channel of an interfering source. To prevent impact of the 30a line at 17.6 MHz-35.2 MHz on an out-of-band spectrum of the 17a line from being mirrored to interfere with an inband spectrum of the 17a line, it needs to be ensured that the first pilot training signal and the second pilot training signal are mutually orthogonal signals, and that the third pilot training signal and the second pilot training signal are mutually orthogonal signals. Therefore, after receiving a feedback error sample signal returned by the 17a line, the VCE can determine a second crosstalk channel coefficient from the 30a line into the 17a line, that is, a crosstalk channel coefficient from the 30a line into an inband spectrum of the 17a line at 0-17.6 MHz and a crosstalk channel coefficient from the 30a line into an out-of-band spectrum of the 17a line at 17.6 MHz-35.2 MHz.

The second pilot sequence and the first pilot sequence are mutually orthogonal. That is, the first pilot sequence and the second pilot sequence may be mutually orthogonal pilot sequences or other pilot sequences that are mutually orthogonal, for example, sufficiently long pseudo-random sequences. In the embodiments of the present disclosure, that all pilot sequences are orthogonal pilot sequences is used as an example for description.

Figure 12:
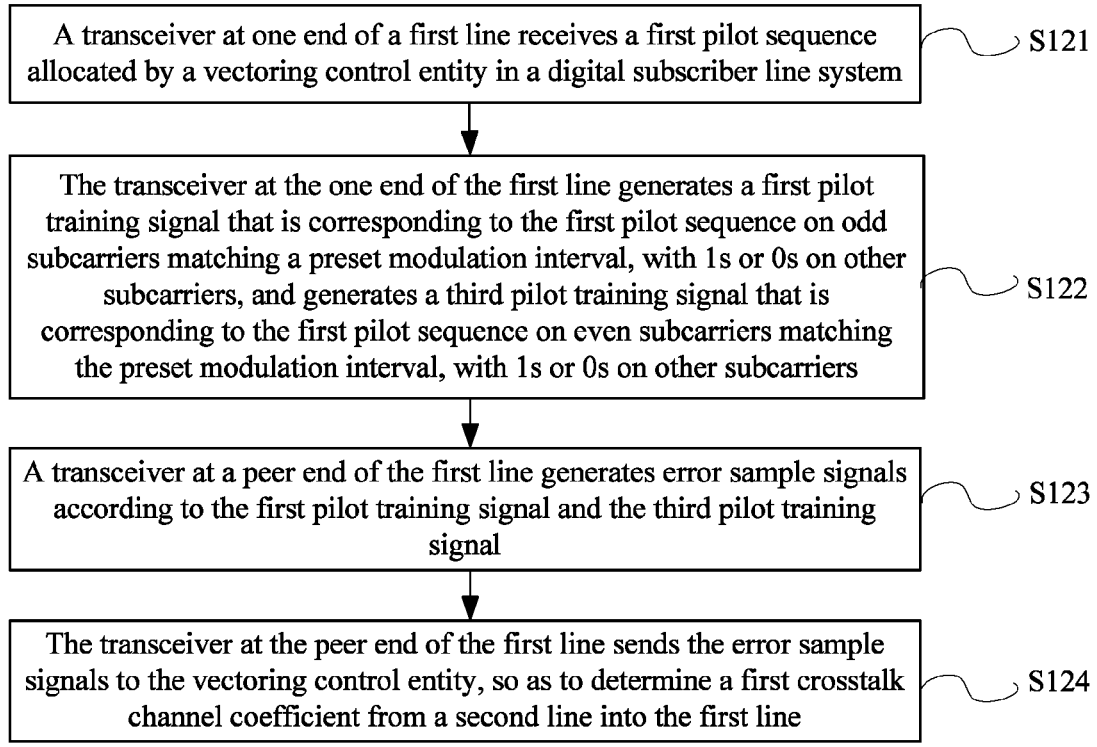
FIG. 12 is a schematic flowchart of Embodiment 8 of a crosstalk estimation method.

FIG. 12 is a schematic flowchart of Embodiment 8 of the crosstalk estimation method provided by the embodiments of the present disclosure. As shown in FIG. 12, this embodiment includes the following steps.

S121. A transceiver at one end of a first line receives a first pilot sequence allocated by a vectoring control entity in a digital subscriber line system.

S122. The transceiver at the one end of the first line generates a first pilot training signal that corresponds to the first pilot sequence on odd subcarriers matching a preset modulation interval, with 1s or 0s on other subcarriers, and generates a third pilot training signal that corresponds to the first pilot sequence on even subcarriers matching the preset modulation interval, with 1s or 0s on other subcarriers.

The preset modulation interval is an integer multiple of 2. For example, a modulation interval is 2, that is, a modulation interval used by the first line is 2. Then, for the first pilot training signal generated by the first line, a pilot value on each odd subcarrier corresponds to a pilot sequence and pilot values on other subcarriers are all 1s or 0s, and for the generated third pilot training signal, a pilot value on each even subcarrier corresponds to a pilot sequence and pilot values on other subcarriers are all 1s or 0s. If a modulation interval used by the first line is 4, a pilot sequence is modulated onto subcarriers 1, 5, 9 and so on of the first pilot training signal generated by the first line, and a pilot sequence of 1s or 0s are modulated onto other subcarriers such as subcarriers 2, 3, 4, 6, 7, and 8, and a pilot sequence is modulated onto subcarriers, 2, 6, 10 and so on of the third pilot training signal, and a pilot sequence of 1s or 0s is modulated onto other subcarriers such as subcarriers 1, 3, 4, 5, 7, 8, and 9.

That is, in a system in which 30a and 17a lines coexist, within an overlapping spectral range of the 30a line and the 17a line, the 30a line modulates, according to a preset modulation interval, a first pilot sequence onto odd subcarriers of a synchronization symbol that match the preset modulation interval, and modulates a pilot sequence whose pilot values are all 1s or 0s onto other subcarriers of the synchronization symbol. Out of the overlapping spectral range of the 30a line and the 17a line, the first pilot sequence is modulated onto even subcarriers of a synchronization symbol that match the preset modulation interval, and a pilot sequence whose pilot values are all 1s or 0s is modulated onto other subcarriers of the synchronization symbol.

Alternatively, S122 may be the transceiver at the one end of the first line generates a first pilot training signal that corresponds to the first pilot sequence on even subcarriers matching a preset modulation interval, with 1s or 0s on other subcarriers, and generates a third pilot training signal that corresponds to the first pilot sequence on odd subcarriers matching the preset modulation interval, with 1s or 0s on other subcarriers.

That is, in a system in which 30a and 17a lines coexist, within an overlapping spectral range of the 30a line and the 17a line, the 30a line modulates a first pilot sequence onto even subcarriers of a synchronization symbol that match a preset modulation interval, and modulates a pilot sequence whose pilot values are all 1s or 0s onto other subcarriers of the synchronization symbol. Out of the overlapping spectral range of the 30a line and the 17a line, the first pilot sequence is modulated onto odd subcarriers of a synchronization symbol that match the preset modulation interval, and a pilot sequence whose pilot values are all 1s or 0s is modulated onto other subcarriers of the synchronization symbol.

S123. A transceiver at a peer end of the first line generates error sample signals according to the first pilot training signal and the third pilot training signal.

S124. The transceiver at the peer end of the first line sends the error sample signals to the vectoring control entity to determine a first crosstalk channel coefficient from the second line into the first line.

For S121, S123, and S124, reference may be made to detailed descriptions of S111, S113, and S114 in the foregoing embodiment and details are not described herein again.

It should be noted that in the foregoing system, to implement such way of working, a flag mode of a synchronization symbol in the system supports flagging on odd or even subcarriers and a flagging interval is an integer multiple of 2.

For a downstream direction, a flag mode of a downstream synchronization symbol needs to support flagging on odd or even subcarriers within an overlapping spectral range of the 30a line and the 17a line with a flagging interval being an integer multiple of 2, and support flagging on even or odd subcarriers out of the overlapping spectral range of the 30a line and the 17a line with a flagging interval being an integer multiple of 2. For an upstream direction, at a handshake stage, a VTU-O and a VTU-R need to notify each other whether they support the foregoing different pilot sequences on odd and even frequencies. For example, it is defined that a flag bit being 1 indicates support and being 0 indicates no support. Then, at the handshake stage, the bit in a notification sent by the VTU-R to the VTU-O being 1 and the bit in a notification sent by the VTU-O to the VTU-R also being 1 indicate that both the VTU-R and the VTU-O support the foregoing different pilot sequences on odd and even frequencies, and that a flag mode of an upstream synchronization symbol supports flagging on odd or even subcarriers within the overlapping spectral range of the 30a line and the 17a line with a flagging interval being an integer multiple of 2, and supports flagging on even or odd subcarriers out of the overlapping spectral range of the 30a line and the 17a line with a flagging interval being an integer multiple of 2. For example, the first pilot sequence is separately modulated onto 2n+1-indexed subcarriers within the overlapping spectral range of the 30a line and the 17a line and 2n-indexed subcarriers out of the overlapping spectral range of the 30a line and the 17a line. When a pilot sequence is to be updated, the VTU-O sends a pilot update command to the VTU-R and transmits a pilot sequence in the foregoing form to the VTU-R, and the VTU-R sends a message as a response to the VTU-O indicating whether the update succeeds.

According to the crosstalk estimation method provided in this embodiment of the present disclosure, a first line generates, according to pilot sequences allocated by a vectoring control entity, pilot training signals within different spectral ranges on different subcarriers according to a preset interval and further determines sample errors. Therefore, the vectoring control entity can determine not only a crosstalk channel coefficient from a second line into the first line but also a crosstalk channel coefficient from the first line into the second line, and then perform precoding processing on to-be-sent data signals of the first line and the second line to eliminate impact of crosstalk between inband spectrums and out-of-band spectrums of the lines. This reduces impact on a line rate caused by inter-line crosstalk in a system in which lines of different profiles coexist, and further improves effects and stability of FTTC acceleration.

Figure 13:
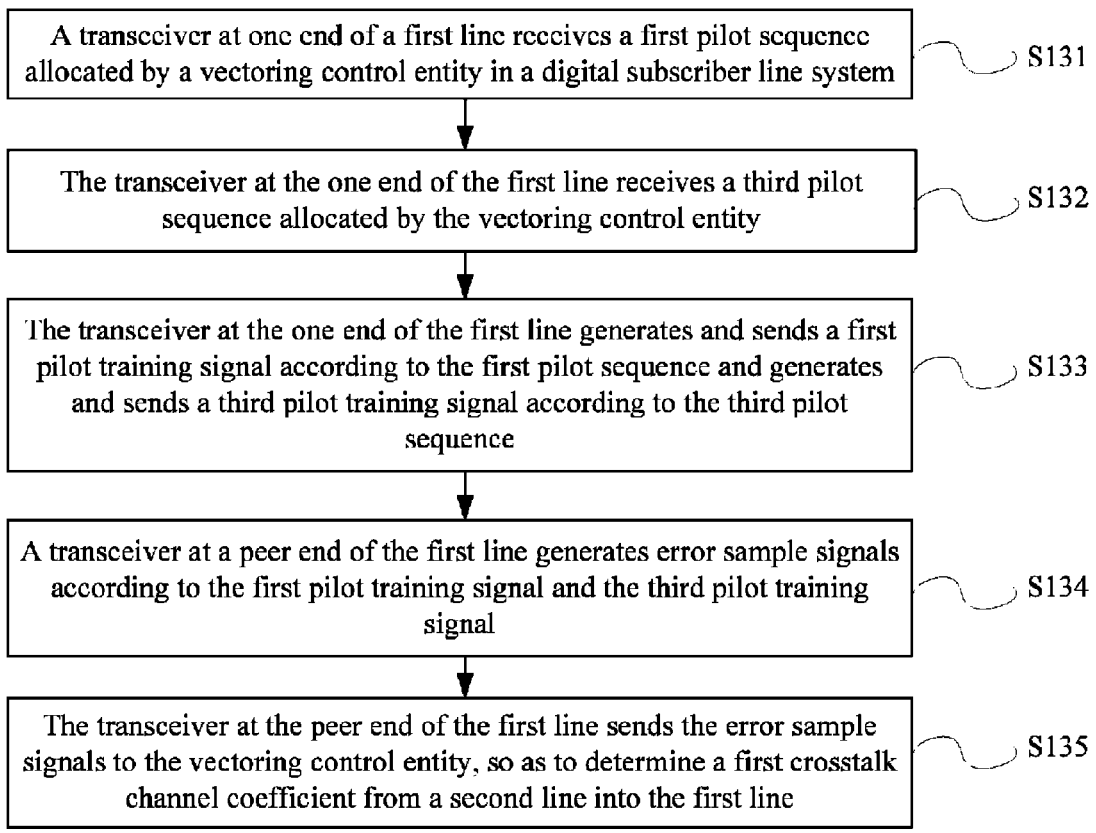
FIG. 13 is a schematic flowchart of Embodiment 9 of a crosstalk estimation method.

FIG. 13 is a schematic flowchart of Embodiment 9 of the crosstalk estimation method provided by the embodiments of the present disclosure. As shown in FIG. 13, if the first pilot training signal, the second pilot training signal, and the third pilot training signal are mutually orthogonal signals, it can be implemented that the first pilot training signal and the second pilot training signal are mutually orthogonal signals and that the third pilot training signal and the second pilot training signal are mutually orthogonal signals. In this case, as shown in FIG. 13, the crosstalk estimation method includes the following steps.

S131. A transceiver at one end of a first line receives a first pilot sequence allocated by a vectoring control entity in a digital subscriber line system.

S132. The transceiver at the one end of the first line receives a third pilot sequence allocated by the vectoring control entity.

The first pilot sequence, a second pilot sequence, and the third pilot sequence are mutually orthogonal.

When allocating a pilot sequence to the first line (30a), the VCE no longer allocates only one pilot sequence for all spectrums but allocates paired pilot sequences at all frequencies, and the paired pilot sequences are mutually orthogonal such that the 30a line modulates the paired pilot sequences onto some frequencies and the other frequencies that are of a synchronization symbol, respectively. For example, in a system in which 30a and 17a lines coexist and the 30a line and the 17a line have an overlapping spectral region, two pilot sequences making orthogonality hold are selected for the 30a line and still another pilot sequence is selected for the 17a line. Assuming that pilot sequences PS1 and PS2 are selected for the 30a line and a pilot sequence PS3 is selected for the 17a line, PS1, PS2, and PS3 make mutual orthogonality hold.

A VTU in the system supports reception of values of different pilot sequences and calculation of error sample signals, at different frequencies of a synchronization symbol.

To implement the foregoing way of working, a vector DSL system needs to ensure, for a downstream direction, a VTU-R needs to support reception of values of different pilot sequences and calculation of error sample signals, at different frequencies of a synchronization symbol, for an upstream direction, at a handshake stage, a VDSL transceiver unit at a central office, VTU-O, and a VTU-R need to notify each other whether they support paired pilot sequences at upstream frequencies. One bit value in a notification may be used to indicate whether the VTU-O or the VTU-R supports paired pilot sequences at the upstream frequencies. For example, the bit value being 1 represents that the VTU-O or the VTU-R supports paired pilot sequences at the upstream frequencies and being 0 represents that the VTU-O or the VTU-R does not support paired pilot sequences at the upstream frequencies. For example, in the upstream direction, #0 and #1 are defined as two pilot sequences paired in frequency, and a transmit end of the 30a line modulates the pilot sequences #0 and #1 onto a non-overlapping subcarrier and an overlapping subcarrier that are of a synchronization symbol, respectively. To update the pilot sequences, the VTU-O sends a pilot update command to the VTU-R and transmits the pilot sequences #0 and #1 to the VTU-R, and the VTU-R sends a response message to the VTU-O such that the VTU-O learns whether the VTU-R has successfully updated the pilot sequences.

S133. The transceiver at the one end of the first line generates and sends a first pilot training signal according to the first pilot sequence and generates and sends a third pilot training signal according to the third pilot sequence.

S134. A transceiver at a peer end of the first line generates error sample signals according to the first pilot training signal and the third pilot training signal.

S135. The transceiver at the peer end of the first line sends the error sample signals to the vectoring control entity to determine a first crosstalk channel coefficient from the second line into the first line.

For S131, S134, and S135, reference may be made to detailed descriptions of S111, S113, and S114 and details are not described herein again.

According to the crosstalk estimation method provided in this embodiment of the present disclosure, a first line generates, according to two pilot sequences that are mutually orthogonal and that are allocated by a vectoring control entity, mutually orthogonal pilot training signals within different spectral ranges and further determines sample errors. Therefore, the vectoring control entity can determine not only a crosstalk channel coefficient from a second line into the first line but also a crosstalk channel coefficient from the first line into the second line, and then perform precoding processing on to-be-sent data signals of the first line and the second line to eliminate impact of crosstalk between inband spectrums and out-of-band spectrums of the lines. This reduces impact on a line rate caused by inter-line crosstalk in a system in which lines of different profiles coexist, and further improves effects and stability of FTTC acceleration.

Figure 14:
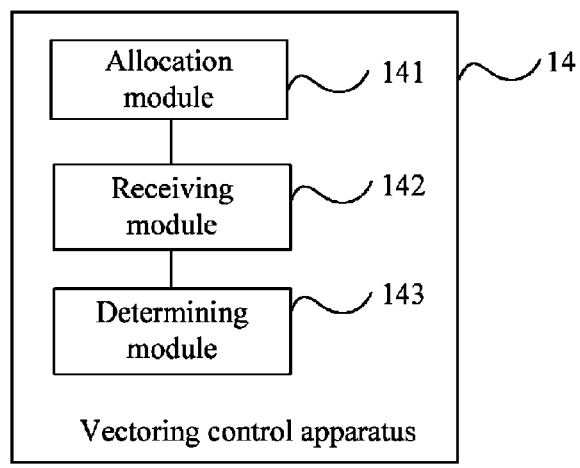
FIG. 14 is a schematic structural diagram of Embodiment 1 of a vectoring control apparatus.

FIG. 14 is a schematic structural diagram of Embodiment 1 of a vectoring control apparatus according to an embodiment of the present disclosure. As shown in FIG. 14, the apparatus 14 includes an allocation module 141, a receiving module 142, and a determining module 143.

The allocating module 141 is configured to allocate a first pilot sequence and a second pilot sequence to a first line and a second line that are in a digital subscriber line system, respectively such that a transceiver at one end of the first line sends a first pilot training signal and a third pilot training signal according to the first pilot sequence, and a transceiver at one end of the second line sends a second pilot training signal according to the second pilot sequence. An out-of-band spectrum of the second line overlaps an inband spectrum of the first line. The first pilot sequence and the second pilot sequence are mutually orthogonal. The first pilot training signal is a pilot training signal of the first line within an overlapping spectral range of the first line and the second line. The third pilot training signal is a pilot training signal of the first line out of the overlapping spectral range of the first line and the second line. The second pilot training signal is a pilot training signal of the second line within an inband spectral range. The first pilot training signal is orthogonal to the third pilot training signal. The second pilot training signal is orthogonal to an out-of-band mirror signal of the third pilot training signal. The receiving module 142 is configured to receive error sample signals sent by a transceiver at a peer end of the first line and a transceiver at a peer end of the second line. The error sample signals are determined by the transceiver at the peer end of the first line and the transceiver at the peer end of the second line according to the received pilot training signals. The determining module 143 is configured to determine, according to the error sample signals, the first pilot sequence, and the second pilot sequence, a first crosstalk channel coefficient from the second line into the first line and a second crosstalk channel coefficient from the first line into the second line.

In one possible implementation form of this embodiment, the third pilot training signal is a mirror signal of the first pilot training signal out of an overlapping spectral region of the first line and the second line.

The vectoring control apparatus provided in this embodiment is a vectoring control entity in a vector DSL system. For functions of the modules in the vectoring control apparatus and a crosstalk estimation process, reference may be made to detailed descriptions in Embodiment 1 of the crosstalk estimation method, and details are not described herein again.

The vectoring control apparatus provided in this embodiment can determine crosstalk channel coefficients between lines according to sample errors that are determined for the lines according to pilot training signals within different spectral ranges, and then perform precoding processing on to-be-sent data signals of the lines to eliminate impact of crosstalk between inband spectrums and out-of-band spectrums of the lines. This reduces impact on a line rate caused by inter-line crosstalk in a system in which lines of different profiles coexist, and further improves effects and stability of FTTC acceleration.

Figure 15:
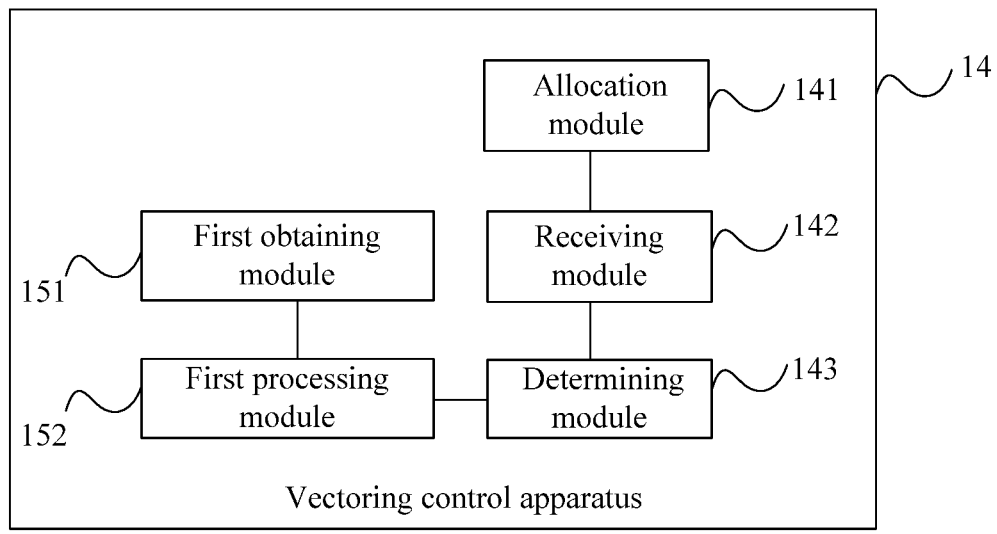
FIG. 15 is a schematic structural diagram of Embodiment 2 of a vectoring control apparatus.

FIG. 15 is a schematic structural diagram of Embodiment 2 of the vectoring control apparatus according to an embodiment of the present disclosure. As shown in FIG. 15, on the basis of FIG. 14, the vectoring control apparatus 14 further includes a first obtaining module 151 and a first processing module 152.

The first obtaining module 151 is configured to obtain a second mirror signal, of a second to-be-sent signal of the second line, out of a band of the second line. The first processing module 152 is configured to perform precoding processing on to-be-sent signals of the first line and the second line according to the first crosstalk channel coefficient, the second crosstalk channel coefficient, and the second mirror signal, to determine precoded signals of the to-be-sent signals of the first line and the second line.

Alternatively, in one possible implementation form of this embodiment, the determining module 143 is further configured to determine a first mirror coefficient of the first crosstalk channel coefficient. The vectoring control apparatus 14 further includes a second obtaining module and a second processing module.

The second obtaining module is configured to obtain a third mirror signal of a third to-be-sent signal of the first line. The third to-be-sent signal is a to-be-sent signal of the first line out of an overlapping spectral range of the first line and the second line. The third mirror signal is a mirror signal of the third to-be-sent signal within the overlapping spectral range of the first line and the second line. The second processing module is configured to perform precoding processing on to-be-sent signals of the first line and the second line according to the first crosstalk channel coefficient, the second crosstalk channel coefficient, the first mirror coefficient, and the third mirror signal, to determine a precoded signal of a first to-be-sent signal of the first line, a precoded signal of the third mirror signal, and a precoded signal of a second to-be-sent signal of the second line. The first to-be-sent signal is a to-be-sent signal of the first line within the overlapping spectral range of the first line and the second line.

For a 30a line, the vectoring control apparatus can eliminate not only crosstalk from an inband signal of a 17a line to the 30a line but also crosstalk from an out-of-band signal of the 17a line to the 30a line. For a 17a line, using the foregoing apparatus can eliminate crosstalk from an inband signal of a 30a line to the 17a line, and additionally crosstalk interference from a 17.6 MHz-35.2 MHz inband spectrum of the 30a line to an inband spectrum of the 17a line also needs to be eliminated.

If a pilot training signal of the 30a line at 17.6 MHz-35.2 MHz and a pilot training signal of the 30a line at 0-17.6 MHz are conjugate symmetric, after the pilot training signal of the 30a line at 17.6 MHz-35.2 MHz is mirrored to within 17.6 MHz as out-of-band crosstalk, a mirror signal is the same as the pilot training signal of the 30a line at 0-17.6 MHz. Therefore, the 17a line cannot estimate a crosstalk channel of an interfering source. To prevent impact of the 30a line at 17.6 MHz-35.2 MHz on an out-of-band spectrum of the 17a line from being mirrored to interfere with an inband spectrum of the 17a line, it needs to be ensured that the first pilot training signal and the second pilot training signal are mutually orthogonal signals, and that the third pilot training signal and the second pilot training signal are mutually orthogonal signals. Therefore, after receiving a feedback error sample signal returned by the 17a line, the VCE can determine a second crosstalk channel coefficient from the 30a line into the 17a line, that is, a crosstalk channel coefficient from the 30a line into an inband spectrum of the 17a line at 0-17.6 MHz and a crosstalk channel coefficient from the 30a line into an out-of-band spectrum of the 17a line at 17.6 MHz-35.2 MHz.

In this case, the allocation module 141 is configured to allocate the first pilot sequence and a third pilot sequence to the first line in the system and allocates the second pilot sequence to the second line such that the first line sends the first pilot training signal according to the first pilot sequence and sends the third pilot training signal according to the third pilot sequence, and the second line sends the second pilot training signal according to the second pilot sequence, where the first pilot sequence, the second pilot sequence, and the third pilot sequence are mutually orthogonal. The determining module 143 is configured to determine a third crosstalk channel coefficient and a fourth crosstalk channel coefficient that are from the second line into the first line and determine the second crosstalk channel coefficient from the first line into the second line according to the error sample signals and the second pilot sequence.

Alternatively, the allocation module 141 is configured to allocate the first pilot sequence and the second pilot sequence, respectively, to the first line and the second line that are in the system such that the transceiver at the one end of the first line generates a first pilot training signal that corresponds to the first pilot sequence on odd subcarriers matching a preset modulation interval, with 1s or 0s on other subcarriers, and generates a third pilot training signal that corresponds to the first pilot sequence on even subcarriers matching the preset modulation interval, with 1s or 0s on other subcarriers. The determining module 143 is configured to calculate a third crosstalk channel coefficient from the first line into the second line on the odd subcarriers matching the preset modulation interval, and calculates a fourth crosstalk channel coefficient from the first line into the second line on the even subcarriers matching the preset modulation interval.

Alternatively, the allocation module 141 is configured to allocate the first pilot sequence and the second pilot sequence, respectively, to the first line and the second line that are in the system such that the transceiver at the one end of the first line generates a first pilot training signal that corresponds to the first pilot sequence on even subcarriers matching a preset modulation interval, with 1s or 0s on other subcarriers, and generates a third pilot training signal that corresponds to the first pilot sequence on odd subcarriers matching the preset modulation interval, with 1s or 0s on other subcarriers. The determining module 143 is configured to separately calculate a third crosstalk channel coefficient from the first line into the second line on the even subcarriers matching the preset modulation interval, and separately calculates a fourth crosstalk channel coefficient from the first line into the second line on the odd subcarriers matching the preset modulation interval.

The preset modulation interval is an integer multiple of 2.

Further, the determining module 143 is further configured to determine a fourth mirror coefficient of the fourth crosstalk channel coefficient within the overlapping spectral range of the first line and the second line.

A third obtaining module is further included configured to obtain a third mirror signal of a third to-be-sent signal of the first line. The third to-be-sent signal is a to-be-sent signal of the first line out of the overlapping spectral range of the first line and the second line. The third mirror signal is a mirror signal of the third to-be-sent signal within the overlapping spectral range of the first line and the second line.

The determining module 143 is further configured to perform precoding processing on to-be-sent signals of the first line and the second line according to the second crosstalk channel coefficient, the third crosstalk channel coefficient, the fourth crosstalk channel coefficient, the fourth mirror coefficient, and the third mirror signal, to determine a precoded signal of a first to-be-sent signal of the first line, a precoded signal of the third to-be-sent signal, and a precoded signal of the second to-be-sent signal of the second line. The first to-be-sent signal is a to-be-sent signal of the first line within the overlapping spectral range of the first line and the second line. The third to-be-sent signal is a to-be-sent signal of the first line out of the overlapping spectral range of the first line and the second line.

For functions of the modules in the vectoring control apparatus provided in this embodiment and a crosstalk estimation process, reference may be made to detailed descriptions in Embodiment 2 to Embodiment 6 of the crosstalk estimation method, and details are not described herein again.

The vectoring control apparatus provided in this embodiment can determine crosstalk channel coefficients between lines according to sample errors that are determined for the lines according to pilot training signals within different spectral ranges, and then perform precoding processing on to-be-sent data signals of the lines to eliminate impact of crosstalk between inband spectrums and out-of-band spectrums of the lines. This reduces impact on a line rate caused by inter-line crosstalk in a system in which lines of different profiles coexist, and further improves effects and stability of FTTC acceleration.

Figure 16:
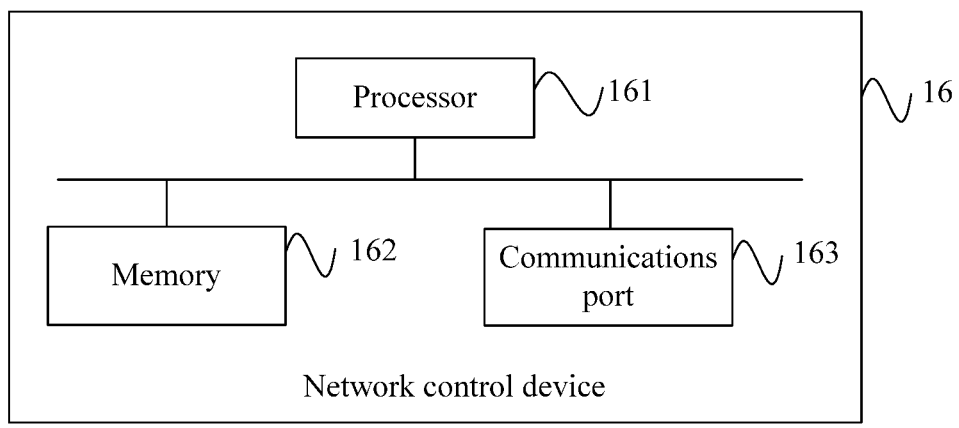
FIG. 16 is a schematic structural diagram of a network control device according to an embodiment of the present disclosure.

FIG. 16 is a schematic structural diagram of a network control device according to an embodiment of the present disclosure. As shown in FIG. 16, the network control device 16 includes a processor 161, a memory 162, and at least one communications port 163.

The communications port 163 is configured to communicate with an external device. The memory 162 is configured to store a computer program instruction. The processor 161, coupled to the memory 162, is configured to call the computer program instruction stored in the memory, to execute the crosstalk estimation method in Embodiment 1 to Embodiment 6 of the crosstalk estimation method.

Figure 17:
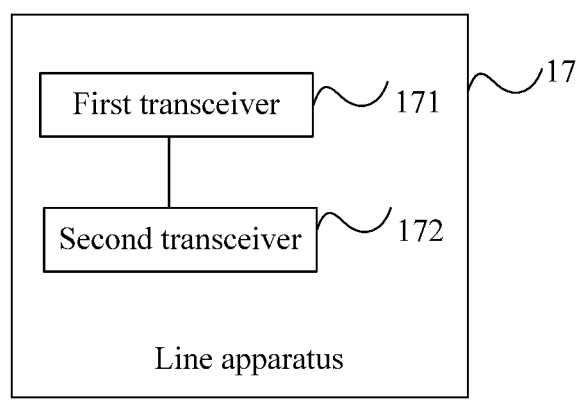
FIG. 17 is a schematic structural diagram of an embodiment of a line apparatus.

FIG. 17 is a schematic structural diagram of an embodiment of a line apparatus provided by the embodiments of the present disclosure. As shown in FIG. 17, the line apparatus 17 includes a first transceiver 171 and a second transceiver 172.

The first transceiver 171 is configured to receive a first pilot sequence allocated by a vectoring control entity in a digital subscriber line system. The first transceiver 171 is further configured to generate and send a first pilot training signal and a third pilot training signal according to the first pilot sequence. The first pilot training signal is a pilot training signal of the first line within an overlapping spectral range of the first line and a second line. The third pilot training signal is a pilot training signal of the first line out of the overlapping spectral range of the first line and the second line. An out-of-band spectrum of the second line overlaps an inband spectrum of the first line. The second transceiver 172 is configured to generate error sample signals according to the first pilot training signal and the third pilot training signal. The second transceiver 172 is further configured to send the error sample signals to the vectoring control entity to determine a first crosstalk channel coefficient from the second line into the first line.

In one possible implementation form of the foregoing embodiment, the second transceiver is configured to send the error sample signals to the vectoring control entity such that the vectoring control entity determines the first crosstalk channel coefficient from the second line into the first line according to the error sample signals, the first pilot sequence, and a second pilot sequence.

The second pilot sequence is a pilot sequence allocated by the vectoring control entity to the second line, the first pilot training signal is orthogonal to a second pilot training signal generated by a transceiver at one end of the second line according to the second pilot sequence, and the third pilot training signal is orthogonal to an out-of-band mirror signal of the second pilot training signal. In another possible implementation form of this embodiment, the third pilot training signal is a mirror signal of the first pilot training signal out of an overlapping spectral region of the first line and the second line.

In a preferred implementation form, to eliminate signal crosstalk between inband spectrums and out-of-band spectrums of lines, the first pilot training signal and the second pilot training signal are mutually orthogonal signals, and the third pilot training signal and the second pilot training signal are mutually orthogonal signals.

Correspondingly, the first transceiver is configured to generate a first pilot training signal that corresponds to the first pilot sequence on odd subcarriers matching a preset modulation interval, with 1s or 0s on other subcarriers, and generate a third pilot training signal that corresponds to the first pilot sequence on even subcarriers matching the preset modulation interval, with 1s or 0s on other subcarriers.

Alternatively, the first transceiver is configured to generate a first pilot training signal that corresponds to the first pilot sequence on even subcarriers matching a preset modulation interval, with 1s or 0s on other subcarriers, and generate a third pilot training signal that corresponds to the first pilot sequence on odd subcarriers matching the preset modulation interval, with 1s or 0s on other subcarriers.

The preset modulation interval is an integer multiple of 2.

Alternatively, for a downstream direction, the line apparatus in the system supports reception of values of different pilot sequences and calculation of error sample signals, at different frequencies of a synchronization symbol. For a downstream direction, at a handshake stage, a VDSL transceiver unit at a central office, VTU-O and a VTU-R need to notify each other whether they support paired pilot sequences at upstream frequencies. One bit value in a notification may be used to indicate whether the VTU-O or the VTU-R supports paired pilot sequences at the upstream frequencies. For example, the bit value being 1 represents that the VTU-O or the VTU-R supports paired pilot sequences at the upstream frequencies and being 0 represents that the VTU-O or the VTU-R does not support paired pilot sequences at the upstream frequencies.

Alternatively, if the first pilot training signal, the second pilot training signal, and the third pilot training signal are all mutually orthogonal signals, it can be ensured that the first pilot training signal and the second pilot training signal are mutually orthogonal signals and that the third pilot training signal and the second pilot training signal are mutually orthogonal signals. In this case, the first transceiver is further configured to receive a third pilot sequence allocated by the vectoring control entity, where the first pilot sequence and the third pilot sequence are mutually orthogonal, and generate and send the first pilot training signal according to the first pilot sequence and generate and send the third pilot training signal according to the third pilot sequence.

For specific functions of the modules in the line apparatus provided in this embodiment and a crosstalk estimation process, reference may be made to detailed descriptions in Embodiment 7 to Embodiment 9 of the crosstalk estimation method, and details are not described herein again.

The line apparatus provided in this embodiment generates, according to pilot sequences allocated by a vectoring control entity, pilot training signals within different spectral ranges on different subcarriers according to a preset interval, and further determines sample errors. Therefore, the vectoring control entity can determine not only a crosstalk channel coefficient from a second line into the first line but also a crosstalk channel coefficient from the first line into the second line, and then perform precoding processing on to-be-sent data signals of the first line and the second line to eliminate impact of crosstalk between inband spectrums and out-of-band spectrums of the lines. This reduces impact on a line rate caused by inter-line crosstalk in a system in which lines of different profiles coexist, and further improves effects and stability of FTTC acceleration.

Figure 18:
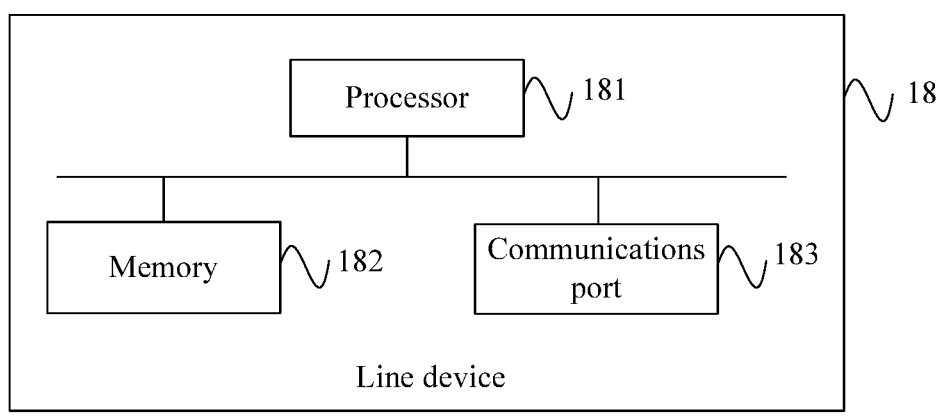
FIG. 18 is a schematic structural diagram of a line device according to an embodiment of the present disclosure.

FIG. 18 is a schematic structural diagram of a line device according to an embodiment of the present disclosure. As shown in FIG. 18, the line device 18 includes a processor 181, a memory 182, and at least one communications port 183.

The communications port 183 is configured to communicate with an external device. The memory 182 is configured to store a computer program instruction. The processor 181, coupled to the memory 182, is configured to call the computer program instruction stored in the memory, to execute the crosstalk estimation method in Embodiment 7 to Embodiment 9 of the crosstalk estimation method.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A crosstalk estimation method, comprising:
receiving, by a transceiver at one end of a first line, a first pilot sequence allocated by a vectoring control entity in a digital subscriber line system;
generating, by the transceiver at the one end of the first line, a first pilot training signal and a third pilot training signal according to the first pilot sequence, wherein the first pilot training signal is a pilot training signal of the first line within an overlapping spectral range of the first line and a second line, wherein the third pilot training signal is a pilot training signal of the first line out of the overlapping spectral range of the first line and the second line, and wherein an out-of-band spectrum of the second line overlaps an inband spectrum of the first line;
sending, by the transceiver at the one end of the first line, the first pilot training signal and the third pilot training signal according to the first pilot sequence;
generating, by a transceiver at a peer end of the first line, error sample signals according to the first pilot training signal and the third pilot training signal; and
sending, by the transceiver at the peer end of the first line, the error sample signals to the vectoring control entity to determine a first crosstalk channel coefficient from the second line into the first line.

2. The crosstalk estimation method according to claim 1, wherein sending, by the transceiver at the peer end of the first line, the error sample signals to the vectoring control entity to determine the first crosstalk channel coefficient from the second line into the first line comprises sending, by the transceiver at the peer end of the first line, the error sample signals to the vectoring control entity such that the vectoring control entity determines the first crosstalk channel coefficient from the second line into the first line according to the error sample signals, the first pilot sequence, and a second pilot sequence, wherein the second pilot sequence is a pilot sequence allocated by the vectoring control entity to the second line, wherein the first pilot training signal is orthogonal to a second pilot training signal generated by a transceiver at one end of the second line according to the second pilot sequence, and wherein the third pilot training signal is orthogonal to an out-of-band mirror signal of the second pilot training signal.

3. The crosstalk estimation method according to claim 1, wherein the third pilot training signal is a mirror signal of the first pilot training signal out of an overlapping spectral region of the first line and the second line.

4. The crosstalk estimation method according to claim 2, wherein the first pilot training signal and the second pilot training signal are mutually orthogonal signals, and wherein the third pilot training signal and the second pilot training signal are mutually orthogonal signals.

5. The crosstalk estimation method according to claim 4, wherein generating the first pilot training signal and the third pilot training signal according to the first pilot sequence comprises:
generating, by the transceiver at the one end of the first line, a first pilot training signal that corresponds to the first pilot sequence on odd subcarriers matching a preset modulation interval with 1s or 0s on other subcarriers; and
generating a third pilot training signal that corresponds to the first pilot sequence on even subcarriers matching the preset modulation interval with 1s or 0s on other subcarriers.

6. The crosstalk estimation method according to claim 4, wherein generating the first pilot training signal and the third pilot training signal according to the first pilot sequence comprises:
generating, by the transceiver at the one end of the first line, a first pilot training signal that corresponds to the first pilot sequence on even subcarriers matching a preset modulation interval with 1s or 0s on other subcarriers; and
generating a third pilot training signal that corresponds to the first pilot sequence on odd subcarriers matching the preset modulation interval with 1s or 0s on other subcarriers.

7. The crosstalk estimation method according to claim 5, wherein the preset modulation interval is an integer multiple of 2.

8. The crosstalk estimation method according to claim 1, further comprising receiving, by the transceiver at the one end of the first line, a third pilot sequence allocated by the vectoring control entity, wherein the first pilot sequence, the second pilot sequence, and the third pilot sequence are mutually orthogonal, and wherein generating the first pilot training signal and third pilot training signal according to the first pilot sequence comprises:
generating, by the transceiver at the one end of the first line, the first pilot training signal according to the first pilot sequence; and
generating the third pilot training signal according to the third pilot sequence.

9. The crosstalk estimation method according to claim 1, wherein the first line is a 30a line and the second line is a 17a line.

10. A line apparatus, comprising:
a first transceiver configured to:
receive a first pilot sequence allocated by a vectoring control entity in a digital subscriber line system; and
send a first pilot training signal and a third pilot training signal according to the first pilot sequence, wherein the first pilot training signal is a pilot training signal of a first line within an overlapping spectral range of the first line and a second line, wherein the third pilot training signal is a pilot training signal of the first line out of the overlapping spectral range of the first line and the second line, and wherein an out-of-band spectrum of the second line overlaps an inband spectrum of the first line; and
a second transceiver is configured to:
generate error sample signals according to the first pilot training signal and the third pilot training signal; and
send the error sample signals to the vectoring control entity to determine a first crosstalk channel coefficient from the second line into the first line.

11. The line apparatus according to claim 10, wherein the second transceiver is further configured to send the error sample signals to the vectoring control entity such that the vectoring control entity determines the first crosstalk channel coefficient from the second line into the first line according to the error sample signals, the first pilot sequence, and a second pilot sequence, wherein the second pilot sequence is a pilot sequence allocated by the vectoring control entity to the second line, wherein the first pilot training signal is orthogonal to a second pilot training signal generated by a transceiver at one end of the second line according to the second pilot sequence, and wherein the third pilot training signal is orthogonal to an out-of-band mirror signal of the second pilot training signal.

12. The line apparatus according to claim 10, wherein the third pilot training signal is a mirror signal of the first pilot training signal out of an overlapping spectral region of the first line and the second line.

13. The line apparatus according to claim 11, wherein the first pilot training signal and the second pilot training signal are mutually orthogonal signals, and wherein the third pilot training signal and the second pilot training signal are mutually orthogonal signals.

14. The line apparatus according to claim 13, wherein the first transceiver is further configured to:
generate a first pilot training signal that corresponds to the first pilot sequence on odd subcarriers matching a preset modulation interval with 1s or 0s on other subcarriers; and
generate a third pilot training signal that corresponds to the first pilot sequence on even subcarriers matching the preset modulation interval with 1s or 0s on other subcarriers.

15. The line apparatus according to claim 13, wherein the first transceiver is further configured to:
generate a first pilot training signal that corresponds to the first pilot sequence on even subcarriers matching a preset modulation interval with 1s or 0s on other subcarriers; and
generate a third pilot training signal that corresponds to the first pilot sequence on odd subcarriers matching the preset modulation interval with 1s or 0s on other subcarriers.

16. The line apparatus according to claim 14, wherein the preset modulation interval is an integer multiple of 2.

17. The line apparatus according to claim 10, wherein the first transceiver is further configured to:
receive a third pilot sequence allocated by the vectoring control entity, wherein the first pilot sequence and the third pilot sequence are mutually orthogonal;
send the first pilot training signal according to the first pilot sequence; and
send the third pilot training signal according to the third pilot sequence.

18. The line apparatus according to claim 10, wherein the first line is a 30a line and the second line is a 17a line.

19. A system, comprising:
a vectoring control entity; and
a line apparatus comprising:
a first transceiver configured to:
receive a first pilot sequence allocated by a vectoring control entity in a digital subscriber line system; and
send a first pilot training signal and a third pilot training signal according to the first pilot sequence, wherein the first pilot training signal is a pilot training signal of a first line within an overlapping spectral range of the first line and a second line, wherein the third pilot training signal is a pilot training signal of the first line out of the overlapping spectral range of the first line and the second line, and wherein an out-of-band spectrum of the second line overlaps an inband spectrum of the first line; and
a second transceiver is configured to:
generate error sample signals according to the first pilot training signal and the third pilot training signal; and
send the error sample signals to the vectoring control entity to determine a first crosstalk channel coefficient from the second line into the first line.

* * * * *